(12) United States Patent
Iwata et al.

(10) Patent No.: US 12,191,504 B2
(45) Date of Patent: Jan. 7, 2025

(54) BIPOLAR METAL-AIR BATTERY, AIR ELECTRODE MANUFACTURING METHOD, AND COLLECTOR MANUFACTURING METHOD

(71) Applicant: Nippon Telegraph and Telephone Corporation, Tokyo (JP)

(72) Inventors: Mikayo Iwata, Musashino (JP); Masaya Nohara, Musashino (JP); Hironobu Minowa, Musashino (JP); Shuhei Sakamoto, Musashino (JP); Takeshi Komatsu, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 770 days.

(21) Appl. No.: 17/312,559

(22) PCT Filed: Dec. 11, 2019

(86) PCT No.: PCT/JP2019/048460
§ 371 (c)(1),
(2) Date: Jun. 10, 2021

(87) PCT Pub. No.: WO2020/137546
PCT Pub. Date: Jul. 2, 2020

(65) Prior Publication Data
US 2022/0093936 A1 Mar. 24, 2022

(30) Foreign Application Priority Data
Dec. 25, 2018 (JP) .................. 2018-240936

(51) Int. Cl.
*H01M 4/86* (2006.01)
*H01M 4/88* (2006.01)
(Continued)

(52) U.S. Cl.
CPC ....... *H01M 4/8631* (2013.01); *H01M 4/8825* (2013.01); *H01M 4/8882* (2013.01);
(Continued)

(58) Field of Classification Search
None
See application file for complete search history.

(56) References Cited

PUBLICATIONS

The Furukawa Battery Co., Ltd., *The Emergency Magnesium-Air Battery "MgBOX Series" is Now Compliant with the Green Purchasing Law*, literature, Feb. 15, 2017, https://corp.furukawadenchi.co.jp/ja/news/news-4202993417749662430.html, pp. 1.
(Continued)

*Primary Examiner* — Lucas J. O'Donnell
(74) *Attorney, Agent, or Firm* — Workman Nydegger

(57) ABSTRACT

The performance of a bipolar type metal air battery is improved while a low environmental load is maintained. The bipolar type metal air battery includes a plurality of cells including air electrodes composed of a co-continuous component having a 3D network structure in which a plurality of nanostructures are integrated by non-covalent bonds, negative electrodes, and an electrolyte disposed between the air electrode and the negative electrode, and a current collector disposed between the plurality of cells, and the plurality of cells are electrically connected in series, and the current collector is in close contact with the negative electrode using a biodegradable material.

20 Claims, 15 Drawing Sheets

(51) Int. Cl.
*H01M 4/90* (2006.01)
*H01M 12/06* (2006.01)
(52) U.S. Cl.
CPC ....... *H01M 4/9016* (2013.01); *H01M 4/9041* (2013.01); *H01M 12/06* (2013.01); *H01M 2004/8689* (2013.01); *H01M 2004/8694* (2013.01)

(56) References Cited

PUBLICATIONS

Mie Industry and Enterprise Support Center, *Succeeded in Trial Development of Bipolar Type Laminated Battery*, literature, Feb. 14, 2011, http:/www.miesc.or.jp/amic/cityarea/news/n110214/index.htm, pp. 1.

BIPOLAR METAL-AIR BATTERY, AIR ELECTRODE MANUFACTURING METHOD, AND COLLECTOR MANUFACTURING METHOD

TECHNICAL FIELD

The present invention relates to a bipolar type metal air battery, and methods of producing an air electrode and a current collector of a bipolar type metal air battery.

BACKGROUND ART

In the related art, alkaline batteries, manganese batteries and the like have been widely used as disposable primary batteries. In addition, with the development of the Internet of Things (IoT) in recent years, the development of distributed sensors that can be installed and used anywhere in the natural world such as in soil and forests has progressed, and small and high-performance coin type lithium primary batteries used for various applications such as these sensors have become widespread.

However, disposable batteries that are currently generally used are composed of minor metals such as lithium, nickel, manganese, and cobalt in many cases, and have a problem of resource depletion. In addition, since a strong alkali such as a sodium hydroxide aqueous solution or an organic electrolytic solution is used as an electrolytic solution, there is a problem that end disposal is not easy. In addition, for example, there is a concern about an impact on the surrounding environment depending on the environment in which it is used, such as when it is used as a drive source for sensors that are embedded in soil.

In order to solve the above problems, an air battery may be exemplified as a candidate for a battery having a low environmental load. Since the air battery uses oxygen and water as positive electrode active materials and a metal such as magnesium, iron, aluminum, and zinc for a negative electrode, the impact on contamination of soil and also the impact on the ecosystem are low. In addition, these are materials with abundant resources and cheaper than minor metals. The research and development of such metal air batteries as batteries having a low environmental load has progressed. For example, a magnesium air battery is sold as an emergency power source in consideration of environmental load reduction (See NPL 1).

However, when a battery is formed without using a substance with an environmental load such as minor metals, there is a problem that the performance of the cell unit is low. In order to improve the battery performance, attempts have been made to increase the voltage and capacity of the battery by combining a plurality of cell units, and a battery using a bipolar electrode unit which can reduce the resistance in connection between cells and is expected to be compact has been proposed (See NPL 2).

CITATION LIST

Non Patent Literature

[NPL 1] Furukawa Battery Co., Ltd., "Emergency magnesium air battery (MgBOX mug box) series has become a product compliant with the Green Purchasing Law", [online], [found on Nov. 15, 2018], Internet <URL: https://corp.furukawadenchi.co.jp/ja/news/news-4202993417749662430.html>

[NPL 2] Mie Industry and Enterprise Support Center, Hokusei Branch, "Prototype of 'bipolar type laminated battery' is successfully developed", [online], [found on Nov. 15, 2018], Internet <URL: http://www.miesc.or.jp/amic/cit-yarea/news/n110214/index.htm>

SUMMARY OF THE INVENTION

Technical Problem

However, when a metal air battery made of a low environmental load material has a bipolar structure, compared to a case in which a metal foil is used as a current collector, the properties with respect to blocking an electrolytic solution are weaker, the solution penetrates into the current collector, liquid junctions may occur, and a metal hydroxide which is a discharge product of a negative electrode and the like may precipitate between the negative electrode and the current collector. Therefore, there is a problem that, as the reaction proceeds, the discharge product inhibits electrical connection between batteries and the contact resistance increases.

The present invention has been made in view of the above circumstances and an objective of the present invention is to improve the performance of a bipolar type metal air battery while maintaining a low environmental load.

Means for Solving the Problem

In order to achieve the above objective, one aspect of the present invention is a bipolar type metal air battery including a plurality of cells including an air electrode composed of a co-continuous component having a 3D network structure in which a plurality of nanostructures are integrated by non-covalent bonds, a negative electrode, and an electrolyte disposed between the air electrode and the negative electrode; and a current collector disposed between the plurality of cells, wherein the plurality of cells are electrically connected in series, and wherein the current collector is in close contact with the negative electrode using a biodegradable material.

In the bipolar type metal air battery, the current collector may be made of cloth, felt, a foil or a plate composed of at least one of carbon, copper, aluminum, zinc, iron, and calcium.

In the bipolar type metal air battery, the nanostructure of the air electrode may be a nanosheet composed of at least one of carbon, iron oxide, manganese oxide, zinc oxide, molybdenum oxide, and molybdenum sulfide or a nanofiber composed of at least one of carbon, iron oxide, manganese oxide, zinc oxide, molybdenum oxide, molybdenum sulfide, and cellulose.

In the bipolar type metal air battery, the electrolyte may be composed of at least one of a chloride, an acetate, a carbonate, a citrate, a phosphate, HEPES(4-(2-hydroxyethyl)-1-piperazineethanesulfonic acid), a pyrophosphate, and a metaphosphate.

In the bipolar type metal air battery, the negative electrode may be composed of at least one of magnesium, aluminum, calcium, iron, and zinc.

In the bipolar type metal air battery, the air electrode may support a catalyst composed of at least one metal of iron, manganese, zinc, copper, and molybdenum or an oxide of at least one metal of calcium, iron, manganese, zinc, copper, and molybdenum.

One aspect of the present invention is a method of producing an air electrode of the bipolar type metal air battery, including a freezing process in which a sol or gel in which the nanostructure is dispersed is frozen to obtain a frozen component; and a drying process in which the frozen component is dried in a vacuum to obtain the co-continuous component.

One aspect of the present invention is a method of producing an air electrode of the bipolar type metal air battery, including a gel production process in which a gel in which iron oxide or manganese oxide nanofibers are dispersed is produced by bacteria; a freezing process in which the gel is frozen; and a drying process in which the frozen gel component is dried.

One aspect of the present invention is a method of producing an air electrode of the bipolar type metal air battery, including a gel production process in which a gel in which cellulose nanofibers are dispersed is produced by bacteria; a freezing process in which the gel is frozen; a drying process in which the frozen gel component is dried; and a carbonization process in which the co-continuous component obtained by drying is heated and carbonized in a gas atmosphere in which cellulose does not burn.

One aspect of the present invention is a method of producing a current collector of the bipolar type metal air battery, including a process in which a water-permeable material is made water impermeable using the biodegradable material; and a process in which the water impermeable material and the negative electrode are brought into close contact with each other using the biodegradable material.

Effects of the Invention

According to the present invention, it is possible to improve the performance of a bipolar type metal air battery while maintaining a low environmental load.

DESCRIPTION OF EMBODIMENTS

Hereinafter, embodiments of the present invention will be described with reference to the drawings.

Figure 1:
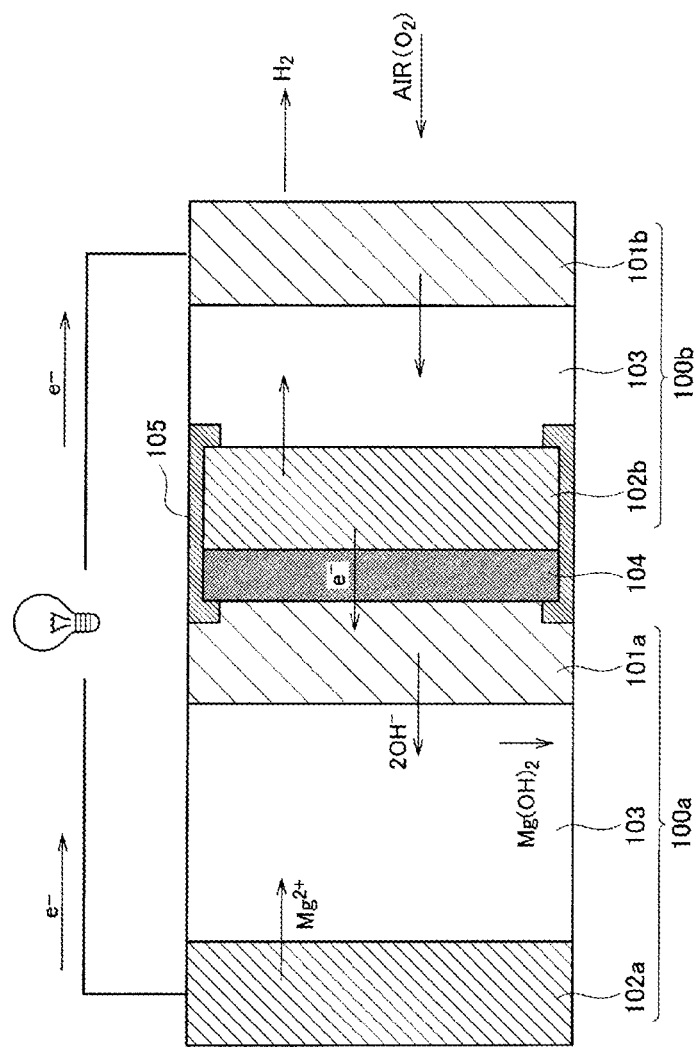
FIG. 1 is a configuration diagram showing a configuration a bipolar type metal air battery according to an embodiment of the present invention.

FIG. 1 is a configuration diagram showing a configuration of a metal air battery according to an embodiment of the present invention (hereinafter referred to as "the present embodiment"). Here, regarding a negative electrode metal, magnesium is described as a representative example (an example). Like a generally well-known metal air battery, in the metal air battery of the present embodiment, air (oxygen) and water are used for positive electrode active materials, and a metal is used for a negative electrode.

The metal air battery shown in FIG. 1 includes a plurality of single cells (batteries) 100a and 100b, a current collector 104 disposed between the plurality of single cells, and a fixing part 105, and the plurality of single cells are electrically connected in series. That is, the metal air battery of the present embodiment is a bipolar type metal air battery in which n−1 current collectors 104 are interposed between n (n≥2) single cells 100a and 100b and n single cells are electrically connected in series. The current collector 104 is in close contact with a negative electrode 102b via the fixing part 105. In other words, the current collector 104 in close contact with the negative electrode 102b is formed between the plurality of single cells 100a and 100b. The fixing part 105 is preferably a biodegradable material.

The first single cell 100a includes a gas diffusion type air electrode 101a which is a positive electrode, a negative electrode 102a, and an electrolyte 103 interposed between the air electrode 101a and the negative electrode 102a. The second single cell 100b includes a gas diffusion type air electrode 101b which is a positive electrode, the negative electrode 102b, and the electrolyte 103 interposed between the air electrode 101b and the negative electrode 102b.

One surface of the air electrode 101b on the outermost layer is exposed to the atmosphere, and the other surface is in contact with the electrolyte 103. One surface of the air electrode 101a, which is not the outermost layer, is in contact with the current collector 104, and the other surface is in contact with the electrolyte 103. In addition, one surface of the negative electrode 102b, which is not the outermost layer, is in contact with the electrolyte 103, and the other surface is in contact with the current collector 104. The surface of the negative electrode 102a on the outermost layer on the side of the electrolyte 103 is in contact with the electrolyte 103. Here, the air electrode 101a and the air electrode 101b may be described as "air electrode 101", and the negative electrode 102a and the negative electrode 102b may be described as "negative electrode 102".

The electrolyte 103 may be either an electrolytic solution or a solid electrolyte. The electrolytic solution is an electrolyte in a liquid form. In addition, the solid electrolyte is an electrolyte in a gel form or a solid form.

In the metal air battery in the present embodiment, the air electrode 101 is composed of a co-continuous component having a 3D network structure in which a plurality of nanostructures are integrated by non-covalent bonds. The co-continuous component is a porous component and has an integrated structure. The nanostructures are nanosheets or nanofibers. The co-continuous component having a 3D network structure in which a plurality of nanostructures are integrated by non-covalent bonds has a structure in which binding parts between nanostructures are deformable and has elasticity.

For example, the nanosheet may be composed of at least one of carbon, iron oxide, manganese oxide, zinc oxide, magnesium oxide, molybdenum oxide, and a molybdenum sulfide compound. The molybdenum sulfide compound is, for example, molybdenum disulfide, phosphorus-doped molybdenum sulfide, or the like. The elements of these materials may be composed of 16 types of essential elements (C, O, H, N, P, K, S, Ca, Mg, Fe, Mn, B, Zn, Cu, Mo, Cl) that are absolutely necessary for plant growth.

It is important that the nanosheet have conductivity. The nanosheet is defined as a sheet-like substance having a thickness of 1 nm to 1 μm, and has a surface longitudinal and lateral length that is 100 times or more the thickness. For example, carbon nanosheets may be formed of graphene. In addition, the nanosheet may be rolled or wavy, and the nanosheet may be curved or bent, and may have any shape.

The nanofibers may be composed of at least one of carbon, iron oxide, manganese oxide, zinc oxide, magnesium oxide, molybdenum oxide, molybdenum sulfide, and cellulose (carbonized cellulose). The elements of these materials may be composed of 16 types of essential elements (C, O, H, N, P, K, S, Ca, Mg, Fe, Mn, B, Zn, Cu, Mo, Cl) that are absolutely necessary for plant growth.

It is important that the nanofibers have conductivity. Nanofibers are defined as a fibrous substance having a diameter of 1 nm to 1 μm and a length that is 100 times or more the diameter. In addition, the nanofibers may be hollow or coiled, but may have any shape. Here, as will be described below, cellulose is used after being made conductive by carbonization.

For example, first, a sol or gel in which nanostructures are dispersed is frozen to form a frozen component (freezing process), the frozen component is dried in a vacuum (drying process), and thus a co-continuous component for the air electrode 101 can be produced. Any gel in which nanofibers made of any of iron oxide, manganese oxide, silicon, and cellulose are dispersed can be produced from predetermined bacteria (gel production process).

In addition, a gel in which cellulose nanofibers are dispersed may be produced from predetermined bacteria (gel production process), this gel may be heated and carbonized in an inert gas atmosphere, and thereby a co-continuous component may be obtained (carbonization process).

For example, the average pore size of the co-continuous component constituting the air electrode 101 is preferably 0.1 to 50 μm and more preferably 0.1 to 2 μm. Here, the average pore size is a value obtained by a mercury press-fitting method.

For the air electrode 101, it is not necessary to use an additional material such as a binder as in the case in which carbon powder is used, which is advantageous in terms of cost and the environment.

Here, an electrode reaction at the air electrode 101 and the negative electrode 102 will be described. Here, regarding a reaction example, a case in which magnesium is used for a negative electrode is described, but when an n-valent metal negative electrode is used, a reaction in which n electrons are released occurs. In an air electrode reaction, on the surface of the air electrode 101 having conductivity, when oxygen in air and an electrolyte come into contact with each other, the reaction shown as "$1/2\ O_2+H_2O+2e^-\rightarrow 2OH^-$ ... (1)" proceeds. On the other hand, in a negative electrode reaction, the reaction of "$Mg\rightarrow Mg^{2+}+2e^-$ ... (2)" proceeds in the negative electrode 102 in contact with the electrolyte 103, and magnesium constituting the negative electrode 102 releases electrons, and dissolves as magnesium ions in the electrolyte 103.

According to these reactions, discharging can be performed. The total reaction is "$Mg+1/2\ O_2+H_2O+2e^-\rightarrow Mg(OH)_2$ ... (3)", and magnesium hydroxide is generated (precipitated) in the reaction. The theoretical electromotive force of the magnesium air battery is about 2.7 V. Compounds related in the above reaction are shown together with components in FIG. 1.

In this manner, in the metal air battery, since the reaction represented by Formula (1) proceeds on the surface of the air electrode 101, it is thought that it is better to generate a large amount of reaction sites inside the air electrode 101.

The air electrode 101, which is a positive electrode, can be produced by a known process such as molding carbon powder with a binder. However, as described above, in the metal air battery, it is important to generate a large amount of reaction sites inside the air electrode 101, and it is desirable that the air electrode 101 have a high specific surface area. For example, in the present embodiment, the specific surface area of the co-continuous component constituting the air electrode 101 is preferably 200 m2/g % or more and more preferably 300 m2/g or more.

In the case of the conventional air electrode, which is produced by molding carbon powder with a binder and pelletizing it, when the specific surface area is increased, the bonding strength between carbon powder particles decreases, the structure deteriorates, and thus it is difficult to perform stable discharging, and the discharging capacity decreases.

On the other hand, according to the air electrode 101 of the present invention composed of a co-continuous component having a 3D network structure in which a plurality of nanostructures are integrated by non-covalent bonds as described above, the above-described conventional problems can be solved and the discharging capacity can increase.

In addition, the air electrode 101 may support a catalyst. The catalyst may be composed of at least one metal of iron, manganese, zinc, copper, and molybdenum, or a metal oxide composed of at least one metal of calcium, iron, manganese, zinc, copper, and molybdenum. Here, the elements of these materials may be composed of metals included in the 16 types of essential elements that are absolutely necessary for plant growth and may have catalytic ability. The metal is preferably iron, manganese, or zinc, and an oxide composed of one of these or a composite oxide composed of two or more of these is preferable. In addition, particularly, manganese oxide ($MnO_2$) is suitable. Manganese oxide is preferable because it exhibits particularly excellent catalytic performance in the present invention.

In addition, a metal oxide used as a catalyst is preferably amorphous as a hydrate. For example, it may be a hydrate of the transition metal oxides mentioned above. More specifically, it may be a manganese oxide(IV)-n hydrate. Here, n is the number of moles of $H_2O$ with respect to 1 mol of $MnO_2$. When a manganese oxide hydrate is supported as nano-sized fine particles in a highly dispersed manner on the surface of the co-continuous component constituting the air electrode 101, excellent battery performance can be obtained.

For example, when a component in which a manganese oxide hydrate ($MnO_2 \cdot nH_2O$) as nano-sized fine particles in a highly dispersed manner is adhered (added) to the co-continuous component of the air electrode 101 is used for the air electrode 101, excellent battery performance can be exhibited. The content of the catalyst contained in the air electrode 101 is 0.1 to 70 weight %, and preferably 1 to 30 weight % with respect to the total weight of the air electrode 101. When a transition metal oxide as a catalyst is added to the air electrode 101, the battery performance is greatly improved. An electrolytic solution containing the electrolyte 103 permeates into the air electrode 101, and at the same time, oxygen gas in the air is supplied, and a three-phase interface of the electrolytic solution-electrode-gas (oxygen) described above is formed. At this three-phase interface site, if the catalyst has high activity, oxygen reduction (discharge) on the surface of the electrode proceeds smoothly, and the battery performance is greatly improved.

Since such a catalyst has a strong interaction with oxygen, which is a positive electrode active material, many oxygen species can be adsorbed on its surface or oxygen species can be occluded in oxygen vacancies.

In this manner, the oxygen species adsorbed on the surface of the metal oxide constituting the catalyst or occluded in the oxygen vacancies are used in an oxygen reduction reaction of the oxygen source (active intermediate reactant) in Formula (1), and the above reaction can easily proceed. In this manner, the metal oxide such as manganese oxide functions effectively as a catalyst. In addition to such metal oxides, a metal itself can be used as a catalyst, and a metal also functions in the same manner as a metal oxide.

As described above, in the metal air battery, in order to improve the efficiency of the battery, it is desirable that there be more reaction sites [the above three-phase part of electrolytic solution/electrode/air (oxygen)] that cause an electrode reaction. In this regard, it is important that a large amount of three-phase parts also be provided on the surface of the catalyst, and the catalyst preferably has a high specific surface area. The specific surface area of the catalyst made of a metal or a metal oxide may be 0.1 to 1,000 $m^2/g$ and is preferably 1 to 500 $m^2/g$. Here, the specific surface area is a specific surface area obtained by a known BET method using $N_2$ adsorption.

The air electrode 101 to which a catalyst is added can be produced by a method of producing the air electrode 101 of the metal air battery to be described below.

Next, the negative electrode 102 will be described. The negative electrode 102 is composed of a negative electrode active substance. The negative electrode active substance is not particularly limited as long as it is a material that can be used as a negative electrode material of a metal air battery, that is, any metal of magnesium, aluminum, calcium, iron, and zinc or an alloy containing these as a main component. The negative electrode 102 (negative electrode active substance) may be composed of one or more of magnesium, aluminum, calcium, iron, and zinc. For example, the negative electrode 102 may be composed of a metal for a negative electrode, a metal sheet, or a component obtained by compressing a powder on a metal foil such as copper.

The negative electrode 102 can be formed by a known method. For example, when magnesium metal is used for the negative electrode 102, a plurality of metal magnesium foils may be superimposed and molded into a predetermined shape, and thus the negative electrode 102 can be produced.

Next, the electrolyte 103 will be described. The electrolyte 103 may be a substance that allows metal ions and hydroxide ions to move between the air electrode 101 (positive electrode) and the negative electrode 102. For example, metal salts containing potassium and sodium, which are abundant on Earth, may be exemplified. Here, the metal salts may be composed of 16 types of essential elements (C, O, H, N, P, K, S, Ca, Mg, Fe, Mn, B, Zn, Cu, Mo, Cl) that are absolutely necessary for plant growth and elements contained in seawater and rainwater.

The electrolyte 103 may be composed of at least one of a chloride (for example, sodium chloride, potassium chloride, and magnesium chloride), an acetate (for example, magnesium acetate), a carbonate, a citrate (for example, magnesium citrate), a phosphate, HEPES(4-(2-hydroxyethyl)-1-piperazineethanesulfonic acid), a pyrophosphate, and a metaphosphate. In addition, it may be composed of a mixture thereof. Since magnesium acetate is one of the components of fertilizers, magnesium acetate is particularly preferable because not only does it have no effect when the electrolyte leaks into soil but also it functions as a soil conditioner.

The electrolyte 103 is composed of an electrolytic solution obtained by performing dissolving in deionized water at a concentration of 0.1 to 10 mol/L and preferably at a concentration of 0.1 to 2 mol/L, or a solid electrolyte (gel electrolyte) obtained by adding a gelling agent to an electrolytic solution.

The gelling agent may be composed of, for example, at least one of plant-derived polysaccharides (cornstarch, potato starch, tapioca starch, dextrin, tamarin seed gum, guar gum, locust bean gum, gum arabic, karaya gum, pectin, cellulose, konjak mannan, and soybean polysaccharides), seaweed-derived polysaccharides (carrageenan, agar, and alginic acid), microorganism-derived polysaccharides (xanthan gum, gellan gum, Agrobacterium succinoglycan, and cellulose), and animal-derived polysaccharides (chitin, chitosan, and gelatin). The weight % of the gelling agent may be 0.01 to 50% and is preferably 0.01% to 10% with respect to the electrolytic solution containing an ion conductor.

The current collector 104 may be composed of at least one of carbon, copper, aluminum, zinc, iron, and calcium. Specifically, the current collector 104 may be made of a material such as cloth, felt, a foil or a plate composed of any of carbon, copper, aluminum, zinc, iron, and calcium or a mixture thereof. Since the battery may cause ionic short circuiting due to the penetration of the electrolytic solution into the current collector 104, it is preferable to secure water impermeability for the current collector. Therefore, when a water-permeable material such as cloth or felt is used, the biodegradable material is formed by filling voids by heat pressing or the like.

The biodegradable material may be any of natural materials, microorganism materials, and chemically synthesized materials, and may be composed of, for example, polylactic acid, polycaprolactone, a polyhydroxy alkanoate, polyglycolic acid, modified polyvinyl alcohol, casein, or modified starch. Particularly, a chemically synthesized material such as plant-derived polylactic acid is preferable. Regarding the biodegradable material, in addition to a biodegradable plastic film, paper on which a coating of a resin such as polyethylene used for milk cartons and the like is formed, an agar film, and the like can also be used.

The fixing part 105 brings the current collector 104 into close contact with the negative electrode 102 in contact with the current collector 104. Since when the electrolytic solution passes around between the current collector and the negative electrode and the discharge product precipitates, the contact resistance increases and deterioration in the battery performance is caused, it is preferable to bring these into close contact with each other using the fixing part 105 in order to eliminate gaps with respect to the negative electrode. It is desirable to use the above biodegradable material for the fixing part 105. For example, when cloth or felt is used for the current collector, it is possible to adhere the peripheral part of the negative electrode and the current collector using the biodegradable material used for securing the above water impermeability. In addition, if a biodegradable sealing tape or the like is used, the negative electrode and the current collector can be brought into close contact with each other in any form of current collector such as cloth, felt, a foil and a plate.

Here, in addition to the above configuration, the metal air battery can include structural members such as a separator, a battery case, and a metal mesh (for example, a copper mesh), and elements required for the metal air battery. Regarding these, conventionally known components can be used. When a gel electrolyte is used, since a likelihood of short circuiting due to the contact between the positive electrode and the negative electrode is low, it is not necessary to use a separator, but the gel electrolyte may be used in combination. Since water in the gel electrolyte is consumed and becomes thinner as the battery reaction proceeds, when the gel electrolyte is not thick enough, if the separator is used, an effect of preventing short circuiting in the battery can be expected. The separator is not particularly limited as long as it is a fiber material, and a cellulose separator made from plant fibers or bacteria is particularly preferable.

Production Method

Next, a production method will be described. The metal air battery of the present embodiment can be produced by appropriately disposing the air electrode 101 obtained by an air electrode production method to be described below, the negative electrode 102, the electrolyte 103, and the current collector 104 and other necessary elements based on a desired metal air battery structure in an appropriate container such as a case. A conventionally known method can be applied for procedures of producing such a metal air battery.

Regarding the method of producing the air electrode 101, production methods 1 and 2 will be described below.

Production Method 1 (Method of Producing Air Electrode)

Figure 2:
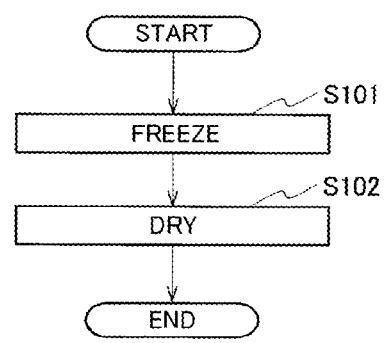
FIG. 2 is a flowchart for explaining a production method 1 according to an embodiment of the present invention.

First, the production method 1 will be described with reference to FIG. 2. FIG. 2 is a flowchart for explaining the production method 1. First, in Step S101, a sol or gel in which nanostructures such as nanosheets and nanofibers are dispersed is frozen to obtain a frozen component (freezing process). Next, in Step S102, the obtained frozen component is dried in a vacuum to obtain a co-continuous component (drying process).

Hereinafter, the processes will be described in more detail. The freezing process of Step S101 is a process of maintaining or constructing a 3D network structure using a nanostructure as a raw material of a co-continuous component having a 3D network structure in which a plurality of nanostructures are integrated by non-covalent bonds and having elasticity.

Here, the gel is a dispersion medium that loses fluidity due to the 3D network structure of dispersoid nanostructures and becomes a solid. Specifically, it is of a dispersion type having a shear modulus of $10^2$ to $10^6$ Pa. The gel dispersion medium is of an aqueous type such as water ($H_2O$) or an organic type such as carboxylic acids, methanol ($CH_3OH$), ethanol ($C_2H_5OH$), propanol ($C_3H_7OH$), n-butanol, isobutanol, n-butylamine, dodecane, unsaturated fatty acids, ethylene glycol, heptane, hexadecane, isoamyl alcohol, octanol, isopropanol, acetone, and glycerin, and two or more thereof may be used in combination.

Further, the sol is a colloid composed of a dispersion medium and dispersoid nanostructures. Specifically, it is of a dispersion type having a shear modulus of 1 Pa or less. The sol dispersion medium is of an aqueous type such as water or of an organic type such as carboxylic acid, methanol, ethanol, propanol, n-butanol, isobutanol, n-butylamine, dodecane, unsaturated fatty acid, ethylene glycol, heptane, hexadecane, isoamyl alcohol, octanol, isopropanol, acetone, and glycerin, and two or more thereof may be used in combination.

The freezing process is performed such that, for example, a sol or gel in which nanostructures are dispersed is accommodated in an appropriate container such as a test tube, the surroundings of the test tube are cooled using a coolant such as liquid nitrogen, and the sol or gel accommodated in the test tube is frozen. A freezing method is not particularly limited as long as the gel or sol dispersion medium can be cooled to a freezing point or lower, and a freezer or like may be used for cooling.

When the gel or sol is frozen, the dispersion medium loses fluidity, the dispersoid is fixed, and the 3D network structure is constructed. In addition, in the freezing process, the specific surface area can be freely adjusted by adjusting the concentration of the gel or sol, and the obtained co-continuous component has a higher specific surface area when the concentration of the gel or sol is lower. However, when the concentration is 0.01 weight % or less, since it is difficult for a 3D network structure to be constructed with the dispersoid, the concentration of the dispersoid is preferably 0.01 to 10 weight % or less.

When a 3D network structure having a high specific surface area is constructed using nanostructures such as nanofibers or nanosheets, pores act as cushions during compression or tension, and excellent elasticity is provided. Specifically, the strain at the elastic limit of the co-continuous component is preferably 5% or more and more preferably 10% or more.

When the dispersoid is not fixed by freezing, since the dispersoid aggregates as the dispersion medium evaporates in the subsequent drying process, it is not possible to obtain a sufficiently high specific surface area, and it is difficult to produce a co-continuous component having a 3D network structure.

Next, the drying process of Step S102 will be described. The drying process is a process in which a dispersoid in which a 3D network structure is maintained or constructed (a plurality of integrated microstructures) is removed from the dispersion medium according to the frozen component obtained in the freezing process.

In the drying process, the frozen component obtained in the freezing process is dried in a vacuum, and the frozen dispersion medium is sublimated in a solid state. For example, this is performed by accommodating the obtained frozen component in an appropriate container such as a flask, and evacuating the inside of the container. When the frozen component is disposed in a vacuum atmosphere, the sublimation point of the dispersion medium is lowered, and even substances that do not sublimate at atmospheric pressure can be sublimated.

The degree of vacuum in the drying process varies depending on the dispersion medium used, and is not particularly limited as long as it is a degree of vacuum at which the dispersion medium sublimates. For example, when water is used as the dispersion medium, it is necessary to set a degree of vacuum to a pressure of 0.06 MPa or less, but because heat is dissipated as sublimation latent heat, time is taken for drying. Therefore, the degree of vacuum is preferably $1.0 \times 10^{-6}$ to $1.0 \times 10^{-2}$ Pa. In addition, heat may be applied using a heater or the like during drying.

In the method of drying in the air, the state of the dispersion medium changes from a solid to a liquid, and then changes from a liquid to a gas, and thus the frozen component becomes a fluid again in a liquid state in the dispersion medium, and a 3D network structure of the plurality of nanostructures collapses. Therefore, in drying in an atmospheric pressure atmosphere, it is difficult to produce a co-continuous component having elasticity.

Production Method 2 (Method of Producing Air Electrode)

Figure 3:
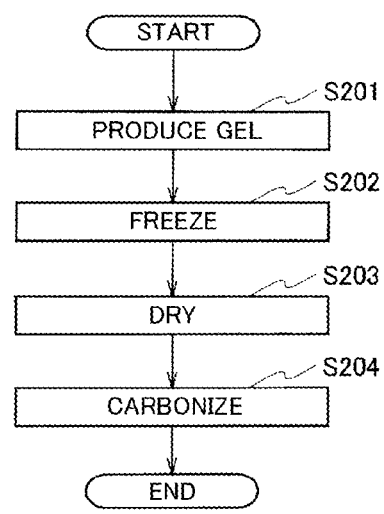
FIG. 3 is a flowchart for explaining a production method 2 according to an embodiment of the present invention.

Next, the production method 2 of the air electrode 101 using a gel produced by bacteria will be described with reference to FIG. 3. FIG. 3 is a flowchart for explaining the production method 2.

First, in Step S201, predetermined bacteria are allowed to produce a gel in which iron oxide, manganese oxide, or cellulose nanofibers are dispersed (gel production process). A co-continuous component is produced using the gel obtained in this manner.

The gel produced by bacteria has nm-order fibers as a basic structure, and a co-continuous component is produced using this gel, and thus the obtained co-continuous component has a high specific surface area. As described above, since it is desirable that the air electrode of the metal air battery have a high specific surface area, it is preferable to use a gel produced by bacteria. Specifically, when a gel produced by bacteria is used, it is possible to synthesize an air electrode (co-continuous component) having a specific surface area of 300 m2/g or more.

Since a bacteria-produced gel has a structure in which fibers are entangled in a coil shape or a mesh shape, and also has a structure in which nanofibers branch based on the growth of bacteria, the co-continuous component that can be produced has excellent elasticity with a strain at the elastic limit of 50% or more. Therefore, the co-continuous component produced using a bacteria-produced gel is preferable for an air electrode of a metal air battery.

In the bacteria-produced gel, two or more of bacterial cellulose, iron oxide, and manganese oxide may be mixed.

Regarding the bacteria, known bacteria may be exemplified, for example, Acetobacters such as *Acetobacter xylinum* subspecies *sucrofermentans*, *Acetobacter xylinum* ATCC23768, *Acetobacter xylinum* ATCC23769, *Acetobacter pasturianus* ATCC10245, *Acetobacter xylinum* ATCC14851, *Acetobacter xylinum* ATCC11142, and *Acetobacter xylinum* ATCC10821, and *Agrobacterium, rhizobium, sarcina, pseudomonas, achromobacter, alcaligenes, aerobacter, azotobacter, zoogloea, enterobacter, kribbella, leptothrix, gallionella, siderocapsa, thiobacillus*, and those produced by culturing various mutant strains created by mutating these by a known method using NTG (nitrosoguanidine) or the like.

In a method of obtaining a co-continuous component using the gel produced by the above bacteria, as in the production method 1, freezing is performed in Step S202 to obtain a frozen component (freezing process), and the frozen component may be dried in a vacuum in Step S203 to obtain a co-continuous component (drying process). However, when a gel in which cellulose nanofibers are dispersed and which is produced by bacteria is used, in Step S204, the produced co-continuous component is carbonized by heating it in a gas atmosphere in which cellulose does not burn (carbonization process).

Since bacterial cellulose, which is a component contained in a bacteria-produced gel, does not have conductivity, when it is used for an air electrode, a carbonization process in which carbonization is performed by a heat treatment in an inert gas atmosphere and conductivity is imparted is important. The co-continuous component carbonized in this manner has a high conductivity, corrosion resistance, high elasticity, and high specific surface area, and is suitable for an air electrode of a metal air battery.

According to the above freezing process and drying process, a co-continuous component having a 3D network structure composed of bacterial cellulose is synthesized, and the bacterial cellulose may be then carbonized by firing at 500° C. to 2,000° C., and more preferably 900° C. to 1,800° C. in an inert gas atmosphere. The gas in which cellulose does not burn may be, for example, an inert gas such as nitrogen gas and argon gas. In addition, it may be a reducing gas such as hydrogen gas and carbon monoxide gas or may be carbon dioxide gas. In the present invention, carbon dioxide gas or carbon monoxide gas, which has an activation effect on the carbon material and can be expected to highly activate the co-continuous component, is more preferable.

Next, regarding the method of producing the air electrode 101 supporting a catalyst, production methods 3 to 6 will be described.

Production Method 3 (Method of Supporting Catalyst on Air Electrode)

Figure 4:
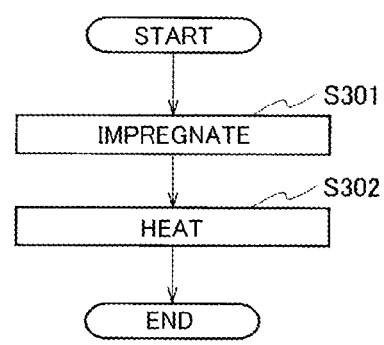
FIG. 4 is a flowchart for explaining a production method 3 according to an embodiment of the present invention.

Next, the production method 3 will be described with reference to FIG. 4. FIG. 4 is a flowchart for explaining the production method 3. As described above, a catalyst may be supported on the air electrode. In Step S301, the co-continuous component obtained in the above production method 1 or production method 2 is impregnated with an aqueous solution of a metal salt serving as a precursor of the catalyst (impregnation process). After an elastic co-continuous component containing a metal salt is prepared in this manner, next, in Step S302, the elastic co-continuous component containing a metal salt may be heated (heating process). Here, a preferable metal for the metal salt used is at least one metal selected from the group consisting of iron, manganese, zinc, copper, and molybdenum. Particularly, manganese is preferable.

A conventionally known method can be used to support a transition metal oxide on the co-continuous component. For example, there is a precipitation method in which a transition metal chloride or transition metal nitrate aqueous solution is impregnated into the co-continuous component, and an alkaline aqueous solution is added dropwise thereto. In addition, there is a sol-gel method in which a transition metal alkoxide solution is impregnated into the co-continuous component and hydrolyzed. Conditions for methods according to such a liquid phase method are known, and these known conditions can be applied. In the present embodiment, the liquid phase method is desirable.

In many cases, the metal oxide supported by the above liquid phase method is in an amorphous state because crystallization has not progressed. A crystalline metal oxide can be obtained by heating an amorphous precursor in an inert atmosphere at a high temperature of about 500° C. Such a crystalline metal oxide exhibits high performance even if it is used as a catalyst for an air electrode.

On the other hand, a precursor powder obtained when the amorphous precursor is dried at a relatively low temperature of about 100° C. to 200° C. is in a hydrated state while maintaining an amorphous state. Formally, the metal oxide hydrate can be represented by $MexOy \cdot nH_2O$ (where, Me indicates the above metal, x and y indicate the numbers of metal atoms and oxygen atoms contained in a metal oxide molecule, and n indicates the number of moles of $H_2O$ with respect to 1 mol of metal oxide). The metal oxide hydrate obtained by drying at such a low temperature can be used as a catalyst.

Since the amorphous metal oxide (hydrate) is hardly sintered, it has a large surface area and the particle size is a very small value of about 30 nm. This is suitable for a catalyst, and when this is used, excellent battery performance can be obtained.

As described above, the crystalline metal oxide exhibits high activity, but the surface area of the metal oxide crystallized by heating at a high temperature described above is significantly reduced, and the particle size becomes about 100 nm due to particle aggregation. Here, the particle size (average particle size) is a value obtained by performing magnified observation using a scanning electron microscope (SEM) or the like, measuring diameters of particles per 10 μm square (10 μm×10 μm), and obtaining an average value.

In addition, particularly, in a catalyst made of a metal oxide that has been subjected to a heat treatment at a high temperature, since particles aggregate, it may be difficult to add the catalyst in a highly dispersed manner to the surface of the co-continuous component. In order to obtain a sufficient catalytic effect, it may be necessary to add a large amount of metal oxide to the air electrode (co-continuous component), and production of the catalyst according to a heat treatment at a high temperature may be disadvantageous in terms of cost.

In order to solve the problem, the following production method 4, production method 5 or production method 6 may be used.

Production Method 4 (Method of Supporting Catalyst on Air Electrode)

Figure 5:
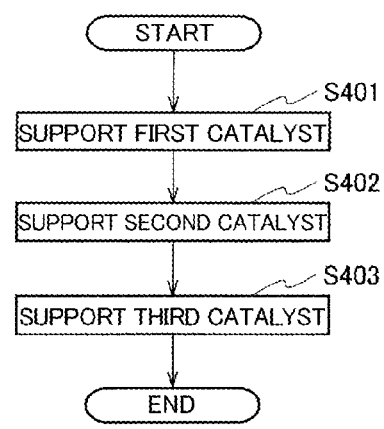
FIG. 5 is a flowchart for explaining production methods 4 to 6 according to an embodiment of the present invention.

Next, the production method 4 will be described with reference to FIG. 5. FIG. 5 is a flowchart for explaining the production methods 4, 5, and 6.

In the production method 4, the catalyst is supported on the co-continuous component produced by the production method 1 or the production method 2. In the production method 4, in addition to the above co-continuous component production, the following catalyst supporting process in which the catalyst is supported is added.

First, in a first catalyst supporting process of Step S401, a co-continuous component is immersed in an aqueous solution containing a surfactant, and the surfactant is adhered to the surface of the co-continuous component.

Next, in a second catalyst supporting process of Step S402, an aqueous solution containing a metal salt is used to adhere the metal salt to a surfactant on the surface of the co-continuous component to which the surfactant is adhered.

Next, in a third catalyst supporting process of Step S403, the co-continuous component to which the metal salt is adhered is heated, and thus a catalyst made of a metal or a metal oxide constituting the metal salt is supported on the co-continuous component.

Here, the metal is at least one metal of iron, manganese, zinc, copper, and molybdenum or a metal oxide composed of at least one metal of calcium, iron, manganese, zinc, copper, and molybdenum. Particularly, manganese (Mn) or manganese oxide ($MnO_2$) is preferable.

The surfactant used in the first catalyst supporting process in the production method 4 is used for supporting a metal or a transition metal oxide in a highly dispersed manner on the air electrode (co-continuous component). If the molecules thereof have hydrophobic groups adsorbed on the carbon surface and hydrophilic groups to which transition metal ions are adsorbed as in a surfactant, metal ions which are transition metal oxide precursors can be adsorbed on the co-continuous component with a high degree of dispersion.

The above surfactant is not particularly limited as long as the molecules have hydrophobic groups adsorbed on the carbon surface and hydrophilic groups to which transition metal ions (for example, manganese ions) are adsorbed, and a nonionic surfactant is preferable. For example, examples of ester type surfactants include glycerin laurate, glycerin monostearate, sorbitan fatty acid esters, and sucrose fatty acid esters. In addition, examples of ether type surfactants include polyoxyethylene alkyl ethers, polyoxyethylene alkyl phenyl ethers, and polyoxyethylene polyoxypropylene glycol.

In addition, examples of ester ether type surfactants include polyoxyethylene sorbitan fatty acid esters, polyoxyethylene hexitane fatty acid esters, and sorbitan fatty acid ester polyethylene glycols. In addition, examples of alkanolamide type surfactants include lauramide and cocamide DEA. In addition, examples of higher alcohol surfactants include cetanol, stearyl alcohol, and oleyl alcohol. In addition, examples of poloxamer type surfactants include poloxamer methacrylate.

In the first catalyst supporting process in the production method 4, the concentration of the aqueous solution of the surfactant is preferably 0.1 to 20 g/L. In addition, immersion conditions such as an immersion time and an immersion temperature include, for example, immersion in a solution at room temperature to 50° C. for 1 to 48 hours.

In the second catalyst supporting process in the production method 4, a metal salt that functions as a catalyst is additionally dissolved in the aqueous solution containing the surfactant in the first catalyst supporting process, or addition of an aqueous solution containing a metal salt is included. Alternatively, separately from the above aqueous solution containing a surfactant, an aqueous solution in which a metal salt that functions as a catalyst is dissolved may be prepared, and the co-continuous component impregnated with (to which is adhered) the surfactant may be immersed therein.

In addition, an aqueous solution in which a metal salt is dissolved may be impregnated into the co-continuous component to which a surfactant is adhered. As necessary, an alkaline aqueous solution may be added dropwise to the obtained co-continuous component containing the metal salt (adhered). This allows the metal or the metal oxide precursor to adhere to the co-continuous component.

In the second catalyst supporting process in the production method 4, the amount of the metal salt added is preferably an amount of 0.1 to 100 mmol/L. In addition, immersion conditions such as an immersion time and an immersion temperature include, for example, immersion in a solution at room temperature to 50° C. for 1 to 48 hours.

More specifically, manganese is exemplified as a metal, and for example, a manganese metal salt (for example, a manganese halide such as a manganese chloride or its hydrates) is added to an aqueous solution which contains a surfactant and is impregnated into the co-continuous component. Next, when an alkaline aqueous solution is added dropwise to the obtained co-continuous component containing a manganese metal salt, a manganese hydroxide as a metal or a metal oxide precursor can be supported on the co-continuous component.

The amount of the catalyst supported by the above manganese oxide can be adjusted according to the concentration of the metal salt (for example, manganese chloride) in the metal salt aqueous solution.

In addition, examples of an alkali used in the above alkaline aqueous solution include hydroxides of alkali metals or alkaline earth metals, ammonia water, an ammonium aqueous solution, and a tetramethylammonium hydroxide (TMAH) aqueous solution. The concentration of this alkaline aqueous solution is preferably 0.1 to 10 mol/L.

In the third catalyst supporting process in the production method 4, the metal or metal oxide precursor (metal salt) adhered to the surface of the co-continuous component is converted into the metal itself or the metal oxide by a heat treatment.

Specifically, the co-continuous component to which the precursor is adhered is dried at room temperature (about 25° C.) to 150° C., and more preferably 50° C. to 100° C. for 1 to 24 hours, and then may be heated at 100° C. to 600° C., and is preferably at 110° C. to 300° C.

In the third catalyst supporting process in the production method 4, when a heat treatment is performed in an inert atmosphere such as argon, helium, or nitrogen or in a reducing atmosphere, it is possible to produce an air electrode formed of the co-continuous component in which the metal itself as a catalyst is adhered to the surface. In addition, when a heat treatment is performed in a gas containing oxygen (oxidizing atmosphere), it is possible to produce an air electrode formed of the co-continuous component in which a metal oxide as a catalyst is adhered to the surface.

In addition, if the heat treatment is performed under the above reducing conditions, a co-continuous component to which the metal itself as a catalyst is adhered is produced temporarily, and the component is then heated in an oxidizing atmosphere, and thus an air electrode formed of the co-continuous component to which a metal oxide as a catalyst is adhered can be produced.

Alternatively, the co-continuous component to which the metal or metal oxide precursor (metal salt) is adhered is dried at room temperature to 150° C., and more preferably 50° C. to 100° C., the metal itself as a catalyst is adhered to the co-continuous component, and thereby a metal/co-continuous component complex may be produced.

In the production method 4, the amount of the metal or metal oxide catalyst adhered (content) is 0.1 to 70 weight % and preferably 1 to 30 weight % based on the total weight of the co-continuous component and the catalyst.

According to the production method 4, it is possible to produce an air electrode in which a metal or metal oxide catalyst is provided in a highly dispersed manner on the surface of the co-continuous component and a metal air battery having excellent electrical characteristics can be constructed.

Production Method 5 (Method of Supporting Catalyst on Air Electrode)

Next, the production method 5 will be described. In the production method 5, a catalyst is supported on the co-continuous component produced as described in the production method 1 and the production method 2 by a method different from the above production method 4. In the production method 5, in addition to the above co-continuous component production, the following catalyst supporting process is added.

In the first catalyst supporting process, the co-continuous component is immersed in an aqueous solution containing a metal salt, and the metal salt is adhered to the surface of the co-continuous component.

Next, in the second catalyst supporting process, when the co-continuous component to which the metal salt is adhered is heated, the catalyst composed of a metal constituting the metal salt is supported on the co-continuous component.

Next, in the third catalyst supporting process, the co-continuous component on which the catalyst is supported is formed into a metal oxide hydrate by allowing water with a high temperature and a high pressure act on the catalyst.

Here, the metal is at least one metal of iron, manganese, zinc, copper, and molybdenum or a metal oxide composed of at least one metal of calcium, iron, manganese, zinc, copper, and molybdenum. Particularly, manganese (Mn) or manganese oxide ($MnO_2$) is preferable.

In the first catalyst supporting process in the production method 5, an aqueous solution containing a metal salt serving as a metal or metal oxide precursor that is finally used as a catalyst is adhered (supported) to and on the surface of the co-continuous component. For example, an aqueous solution in which the metal salt is dissolved may be separately prepared and the aqueous solution may be impregnated into the co-continuous component. Impregnation conditions and the like are the same as those in the related art described above.

The second catalyst supporting process in the production method 5 is the same as the third catalyst supporting process in the production method 4, and the heat treatment may be performed in an inert atmosphere or a reducing atmosphere. In addition, when the co-continuous component to which the precursor is adhered is heated (dried) at a low temperature (room temperature to 150° C., more preferably 50° C. to 100° C.), which is described as another method of the third catalyst supporting process in the production method 4, the metal may be adhered to the co-continuous component.

The air electrode 101 in which the metal itself is used as a catalyst exhibits high activity. However, since the catalyst is a metal, it is vulnerable to corrosion and may lack long-term stability. On the other hand, long-term stability can be realized by heating the metal and converting it into a metal oxide hydrate according to the third catalyst supporting process in the production method 5 to be described in detail.

In the third catalyst supporting process in the production method 5, the metal oxide hydrate is adhered to the co-continuous component. Specifically, the co-continuous component to which the metal is adhered obtained in the second catalyst supporting process in the production method 5 is immersed in water with a high temperature and a high pressure, and the adhered metal is converted into a catalyst composed of the metal oxide hydrate.

For example, the co-continuous component to which the metal is adhered is immersed in water at 100° C. to 250° C. and more preferably 150° C. to 200° C., and the adhered metal may be oxidized to form a metal oxide hydrate.

Since the boiling point of water under atmospheric pressure (0.1 MPa) is 100° C., it is generally not possible to immerse the component in water at 100° C. or higher under atmospheric pressure. However, when a predetermined sealed container is used and the pressure in the sealed container is increased to, for example, 10 to 50 MPa, and preferably about 25 MPa, the boiling point of water in the sealed container rises and liquid water at 100° C. to 250° C. can be realized. When the co-continuous component to which the metal is adhered is immersed in water with a high temperature obtained in this manner, the metal can be converted into a metal oxide hydrate.

Production Method 6 (Method of Supporting Catalyst on Air Electrode)

Next, the production method 6 will be described. In the production method 6, a catalyst is supported on the co-continuous component produced as described in the production method 1 and the production method 2 by a method different from the above production methods 4 and 5. In the production method 6, in addition to the above co-continuous component production, the following first and second catalyst supporting processes in which a catalyst is supported are added. In the production method 6, there is no third catalyst supporting process.

In the first catalyst supporting process, the co-continuous component is immersed in an aqueous solution containing a metal salt, and the metal salt is adhered to the surface of the co-continuous component.

Next, in the second catalyst supporting process, the co-continuous component to which the metal salt is adhered is allowed to act on water with a high temperature and a high pressure, and thus the catalyst composed of the metal oxide hydrate with the metal constituting the metal salt is supported on the co-continuous component.

Here, the metal may be at least one metal of iron, manganese, zinc, copper, and molybdenum.

The first catalyst supporting process in the production method 6 is the same as the first catalyst supporting process in the production method 5, and descriptions thereof will be omitted here.

In the second catalyst supporting process in the production method 6, the precursor (metal salt) adhered to the surface of the co-continuous component is converted into a metal oxide hydrate by heating at a relatively low temperature.

Specifically, the co-continuous component to which the precursor is adhered is allowed to act on water with a high temperature and a high pressure, and then dried at a relatively low temperature of about 100° C. to 200° C. Thereby, the precursor becomes a hydrate in which water molecules are present in particles while the precursor maintains an amorphous state. The metal oxide hydrate obtained by drying at a low temperature in this manner is used as a catalyst.

In the air electrode produced by the production method 6, the metal oxide hydrate in the form of nano-sized fine particles is supported in a highly dispersed manner on the co-continuous component. Thus, when such a co-continuous component is used for an air electrode, excellent battery performance can be exhibited.

The co-continuous component obtained by each of the production methods can be molded into a predetermined shape according to a known procedure to form an air electrode. For example, catalyst-unsupported and catalyst-supported co-continuous components are processed into a plate-like component or a sheet, and the obtained co-continuous components may be cut into a circle with a desired diameter (for example, 23 mm) using a punching blade, a laser cutter or the like to form an air electrode.

Next, a method of producing the current collector 104 will be described in a production method 7.

Production Method 7 (Method of Producing Current Collector)

Figure 6:
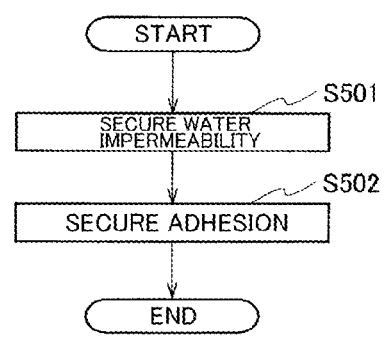
FIG. 6 is a flowchart for explaining a production method 7 according to an embodiment of the present invention.
Figure 7A:
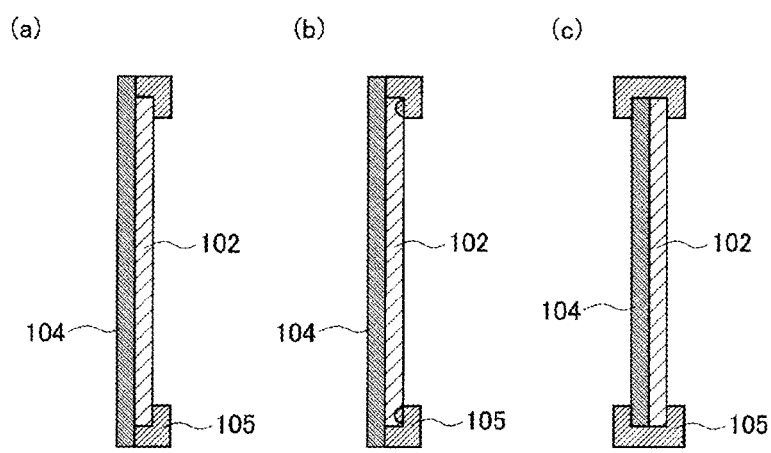
FIG. 7A is a cross-sectional view showing a configuration of a current collector and a negative electrode according to an embodiment of the present invention.
Figure 7B:
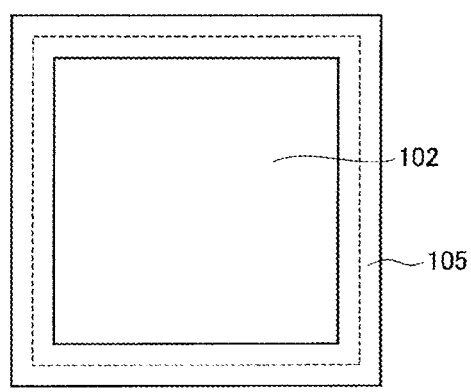
FIG. 7B is a plan view showing a configuration of a current collector and a negative electrode according to an embodiment of the present invention.

Next, the production method 7 will be described. As described above, the current collector needs to be impermeable to water in order to prevent ionic short circuiting and needs to be in close contact with the negative electrode in order to reduce the contact resistance. FIG. 6 is a flowchart for explaining the production method 7, FIG. 7A is a cross-sectional view of a configuration of a current collector and a negative electrode produced by the production method 7, and FIG. 7B is a plan view when viewed from the side of the negative electrode.

When a water-permeable material (for example, a material that allows water to pass through such as cloth or felt) is used for the current collector, the production method 7 includes a process in which the water-permeable material is made water-impermeable using a biodegradable material (for example, a biodegradable plastic, a biodegradable resin, and a biodegradable adhesive) and a process in which the water-impermeable material and a negative electrode are brought into close contact with each other using a biodegradable material. Details are as follows.

First, in Step S501, in order to make the current collector water-impermeable, when a water-permeable fibrous material such as cloth or felt is used for the current collector, the biodegradable material is caused to enter voids of the current collector using a heat press or the like. The biodegradable material may be any of natural materials, microorganism materials, and chemically synthesized materials, and may be composed of, for example, polylactic acid, polycaprolactone, polyhydroxy alkanoate, polyglycolic acid, modified polyvinyl alcohol, casein, or modified starch. Particularly, a chemically synthesized material such as plant-derived polylactic acid is preferable. Regarding the biodegradable material, in addition to a biodegradable plastic film, paper on which a coating of a resin such as polyethylene used for milk cartons and the like is formed, an agar film, and the like can also be used. When the current collector is a foil or plate, this treatment is not necessary because it is water-impermeable.

Next, in Step S502, the negative electrode is brought into close contact with the current collector for which water impermeability has been secured. FIG. 7A is a cross-sectional view when the current collector and the negative electrode are brought into close contact with each other, and FIG. 7B is a view when viewed from the side of the negative electrode. Examples of a method of bringing them into close contact with each other include use of heat sealing, an adhesive, and a sealing tape, but the method is not particularly limited. FIG. 7A shows three examples.

When the current collector impregnated with a biodegradable material in S501 is used, as shown in FIG. 7A(a), the negative electrode 102 smaller than the current collector 104 is disposed, a biodegradable material 105 (fixing part) cut out to cover the periphery of the negative electrode 102 is disposed thereon, and heat sealing is performed, and thus adhesion between the negative electrode 102 and the current collector 104 can be secured. In this case, as shown in FIG. 7A(b), in order to improve adhesion between the negative electrode 102 and the biodegradable material 105, a depression such as a dent may be provided in a part of the seal part of the negative electrode 102. Since the negative electrode 102 has a depression, the biodegradable material 105 enters it during heat fusion, and the adhesion is improved.

In addition, when the biodegradable material 105 such as a biodegradable sealing tape or wrapping film composed of polylactic acid, polycaprolactone, polyhydroxy alkanoate, polyglycolic acid, modified polyvinyl alcohol, casein, or modified starch is used, the negative electrode 102 and the current collector 104 can be brought into close contact with each other with the current collector 104 in any form such as cloth, felt, a foil and a plate, and the size of the negative electrode 102 may be the same as that of the current collector 104 as shown in FIG. 7A(c).

EXAMPLES

More details will be described below with reference to examples. First, the configuration of the battery actually used will be described with reference to FIG. 8A and FIG.

Figure 8A:
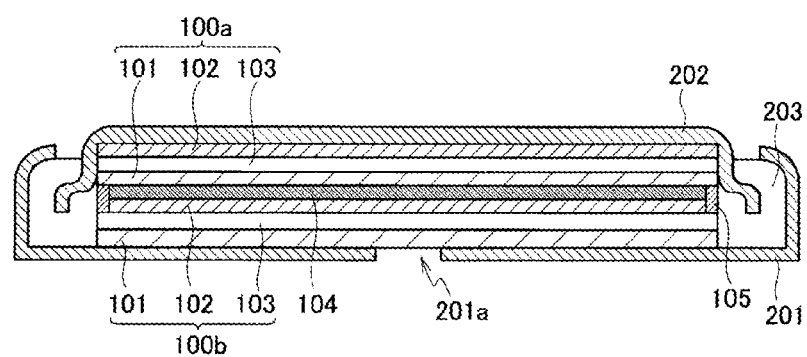
FIG. 8A is a cross-sectional view showing a more detailed configuration example of a coin cell type metal air battery according to an embodiment of the present invention.
Figure 8B:
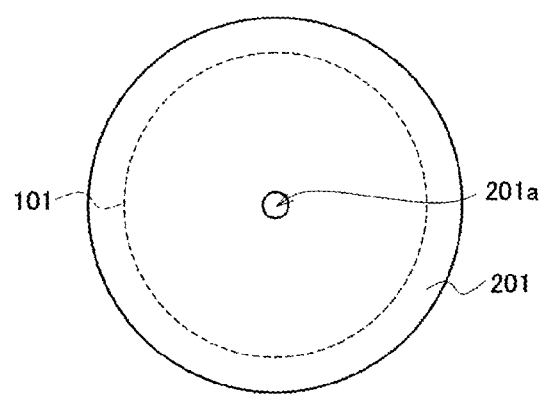
FIG. 8B is a plan view showing a more detailed configuration example of a coin cell type metal air battery according to an embodiment of the present invention.

8B. FIG. 8A is a cross-sectional view showing a more detailed configuration example of a coin cell type metal air battery and FIG. 8B is a plan view showing a configuration example of the coin cell type metal air battery. FIG. 8B is a battery exterior view of the metal air battery in FIG. 8A when viewed from the bottom to the top. However, all sizes are scaled down due to the limitation of the limited paper area.

The battery in the present embodiment can be produced in a conventional shape such as a coin shape, a cylindrical shape, and a lamination shape. Regarding a method of producing these batteries, the same method in the related art can be used.

The coin cell type battery shown in FIG. 8A and FIG. 8B includes the plurality of single cells 100a and 100b, the current collector 104, and the fixing part 105. The illustrated coin cell type battery includes two single cells 100a and 100b. Each of the single cells 100a and 100b includes the air electrode 101, the negative electrode 102 and the electrolyte 103 disposed therebetween. The current collector 104 and the fixing part 105 are disposed between the plurality of single cells 100a and 100b. The fixing part 105 brings the current collector 104 into close contact with the negative electrode 102 in contact with the current collector 104.

The electrolyte 103 in this case is a sheet-like separator impregnated with an electrolytic solution or a gel electrolyte obtained by adding a gelling agent to an electrolytic solution. In addition, an air electrode case 201 is disposed on the side of the air electrode 101 of the first single cell 100a and a negative electrode case 202 is disposed on the side of the negative electrode 102a of the second single cell 100b. The air electrode case 201 has an opening 201a, and the surroundings air can come into contact with the air electrode 101. In addition, the air electrode case 201 and the negative electrode case 202 are fitted using a caulking machine or the like, and a gasket 203 is disposed at the fitted part.

The electrolyte 103 is interposed between the air electrode 101 and the negative electrode 102 to form the single cells 100a and 100b. In the illustrated example, the two single cells 100a and 100b are superimposed, the current collector 104 is interposed therebetween to form a two-series battery, this two-series battery is disposed between the air electrode case 201 and the negative electrode case 202, and the air electrode case 201 and the negative electrode case 202 are fitted and integrated.

Here, in Examples 1 to 7, evaluation is performed using a coin battery, but the evaluation is performed using the configuration of the single cell, and in Example 8, a two-series configuration is formed in the coin battery.

Figure 9A:
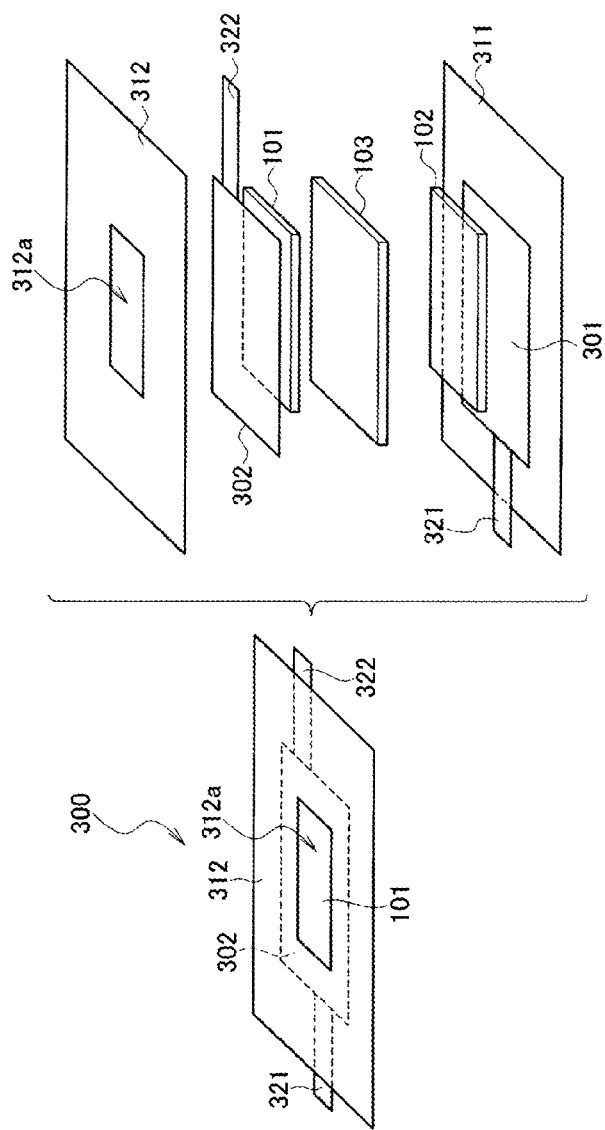
FIG. 9A is a configuration diagram showing a configuration of a metal air battery according to an embodiment of the present invention.
Figure 9B:
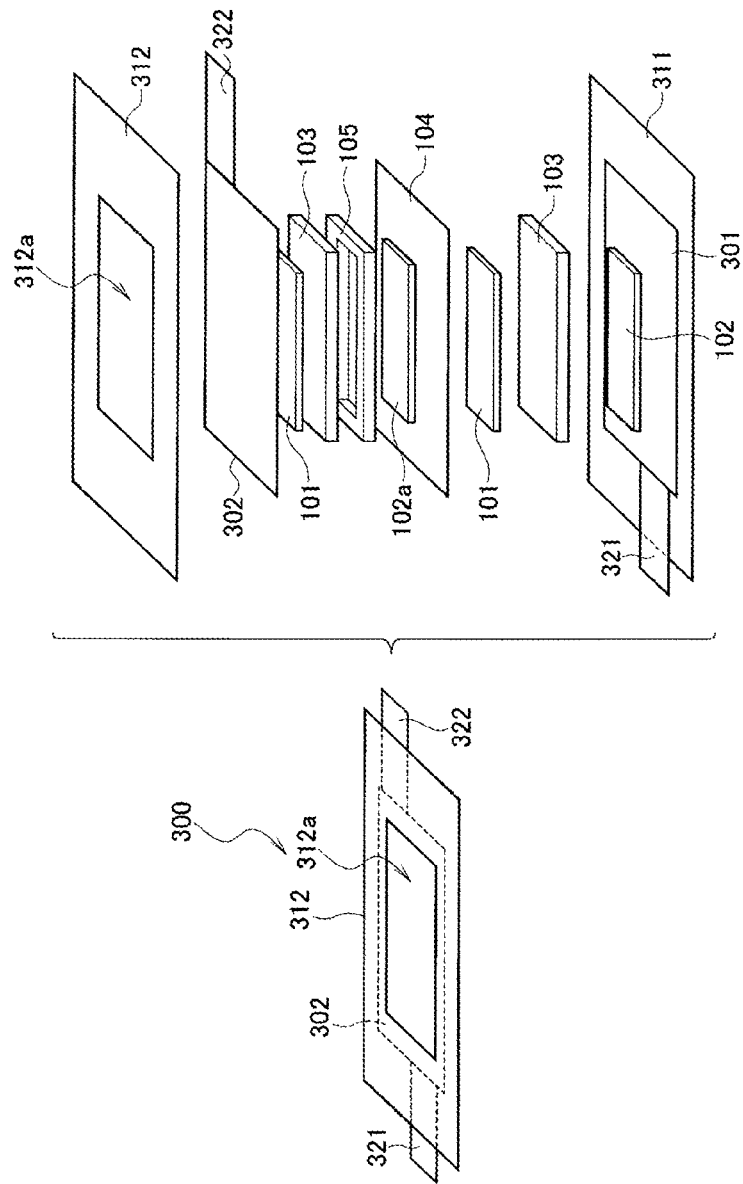
FIG. 9B is a configuration diagram showing a configuration of a metal air battery according to an embodiment of the present invention.

In addition, as shown in FIG. 9A and FIG. 9B, using a housing 300 in which a part of the battery is released, the battery cell may be accommodated in the housing 300. FIG. 9A shows a configuration in which one single cell is accommodated in the housing 300, and FIG. 9B shows a configuration in which two single cells are accommodated in series in the housing 300. The housing 300 includes a first housing 311 disposed on the side of the negative electrode 102 and a second housing 312 disposed on the side of the air electrode 101. In the second housing 312, an opening 312a is formed, and the surroundings air can come in contact with the air electrode 101. In addition, a negative electrode current collector 301 is provided between the first housing 311 and the negative electrode 102, a positive electrode current collector 302 is provided between the second housing 312 and the air electrode 101, and terminals 321 and 322 are removed therefrom to the outside of the housing 300. Here, when a metal is used for the negative electrode 102, the terminal may be directly removed from the negative electrode 102 to the outside without using the negative electrode current collector 301.

In addition, when the negative electrodes 102 and 102a, the electrolyte 103, and the air electrode 101 are formed into a single cell, as shown in FIG. 9B, the bipolar layer current collector 104 is disposed between the single cell and the single cell, and the fixing part 105 is provided to fix the negative electrode 102a in contact with the current collector 104 to the current collector 104. The current collector 104 serves as an air electrode current collector and a negative electrode current collector.

In the metal air battery having the above configuration, the electrolyte 103 may be composed of a sheet of a water absorbent insulator such as a coffee filter, kitchen paper, or filter paper, and for example, a sheet of a naturally decomposable material such as a cellulose separator made from plant fibers is particularly preferably used for the electrolyte 103.

In addition, the housing 300 can seal the interior of the battery cell other than the air electrode and keep the battery cell therein, and may be made of a naturally decomposable material. The housing 300 may be made of any material of natural materials, microorganism materials, and chemically synthesized materials, and may be composed of, for example, polylactic acid, polycaprolactone, polyhydroxy alkanoate, polyglycolic acid, modified polyvinyl alcohol, casein, or modified starch. Particularly, a chemically synthesized material such as plant-derived polylactic acid is preferable. In addition, the shape of the housing 300 is not limited as long as it is a shape obtained by processing a biodegradable plastic. Regarding an exemplary material that can be applied for the housing 300 include, in addition to a commercially available biodegradable plastic film, paper on which a coating of a resin such as polyethylene used for milk cartons and the like is formed, an agar film, and the like can also be used.

When the first housing 311 and the second housing 312 made of the above material are adhered at the peripheral part, it is possible to seal the interior of the battery cell other than the air electrode 101. Examples of adhesion methods include use of heat sealing and an adhesive, and the method is not particularly limited. It is preferable to use an adhesive made of a biodegradable resin. Here, the shapes of the air electrode 101, the negative electrode 102, the electrolyte 103, the first housing 311, the second housing 312, the negative electrode current collector 301, and the positive electrode current collector 302 are not limited as long as their dispositions for operating as a battery are not impaired. For example, in a plan view, a rectangular or circular sheet shape, or a rolled shape can be used.

The metal air battery having the housing 300 composed of the above naturally decomposable material is naturally decomposed over time when used in a disposable device, for example, a soil water sensor, and there is no need to collect the battery. In addition, because it is composed of a naturally derived material and fertilizer component, it has very low burden on the environment. There is no need to collect the battery even if it is used in the natural world such as in the forest or under the sea in addition to in soil, and the battery can be disposed as burnable garbage when it is used in a general living environment.

Example 1

First, Example 1 will be described. Example 1 was an example in which a co-continuous component having a 3D network structure in which a plurality of nanosheets were integrated by non-covalent bonds was used for an air electrode. The air electrode was synthesized as follows. In the following description, a production method using graphene as a nanosheet will be described as a representative, but the co-continuous component having a 3D network structure can be adjusted by changing graphene to a nanosheet made of other materials. Here, the following porosity is calculated by modeling pores as cylindrical shapes from a pore size distribution obtained by a mercury press-fitting method for the co-continuous component.

First, a commercially available graphene sol [dispersion medium: water ($H_2O$), 0.4 weight %, commercially available from Sigma-Aldrich] was put into a test tube, the test tube was immersed in liquid nitrogen for 30 minutes, and the graphene sol was completely frozen. The graphene sol was completely frozen, and the frozen graphene sol was then put into an eggplant flask, and dried in a vacuum at 10 Pa or less with a freeze-dryer (commercially available from Tokyo Rikakikai Co., Ltd.), and thereby an elastic co-continuous component having a 3D network structure containing a graphene nanosheet was obtained.

The obtained co-continuous component was evaluated by performing an X-ray diffraction (XRD) measurement, a scanning electron microscope (SEM) observation, a porosity measurement, a tension test, and a BET specific surface area measurement. It was confirmed that the co-continuous component produced in the present example was a carbon (C, PDF card No. 01-075-0444) single phase according to the XRD measurement. Here, the PDF card No is a card number of Powder Diffraction File (PDF) which is a database collected by International Centre for Diffraction Data (ICDD), and the same applies hereinafter.

In addition, according to the SEM observation and mercury press-fitting method, it was confirmed that the obtained co-continuous component was a co-continuous component in which nanosheets (graphene pieces) were continuously connected and having an average pore size of 1 μm. In addition, when the BET specific surface area of the co-continuous component was measured by the mercury press-fitting method, it was 510 $m^2/g$. In addition, when the porosity of the co-continuous component was measured by the mercury press-fitting method, it was 90% or more. In addition, based on the results of the tension test, it was confirmed that, even if a strain of 20% was applied by tension stress, the obtained co-continuous component was restored to the shape before the stress was applied without exceeding the elastic region.

Such a graphene co-continuous component was cut into a circle having a diameter of 14 mm using a punching blade, a laser cutter, or the like to obtain a gas diffusion type air electrode.

The negative electrode was adjusted by cutting a commercially available metal zinc plate (with a thickness of 300 μm, commercially available from The Nilaco Corporation) into a circle having a diameter of 14 mm using a punching blade, a laser cutter or the like.

Regarding the electrolytic solution, a solution in which sodium chloride (NaCl, commercially available from Kanto Chemical Co., Inc.) was dissolved in pure water at a concentration of 1 mol/L was used. Regarding the separator, a battery cellulose separator (commercially available from Nippon Kodoshi Corporation) was used.

A single-cell coin cell type zinc air battery described in FIG. 8A and FIG. 8B was produced using the above-described air electrode, negative electrode, electrolytic solution as an electrolyte, and separator. First, the above air electrode was installed in an air electrode case in which the peripheral part of a copper mesh foil (commercially available from MIT Japan) was fixed inside by spot welding. In addition, in the negative electrode composed of a metal zinc plate, the peripheral part was fixed to a copper mesh foil (commercially available from MIT Japan) by spot welding, and additionally, the copper mesh foil was fixed to a negative electrode case by spot welding. Next, the separator was disposed on the air electrode installed in the air electrode case, and the electrolytic solution was injected into the disposed separator. Next, the air electrode case was covered with the negative electrode case to which the negative electrode was fixed, the peripheral parts of the air electrode case and the negative electrode case were caulked by a coin cell caulking machine, and thus a coin cell type zinc air battery containing a polypropylene gasket was produced.

Figure 10:
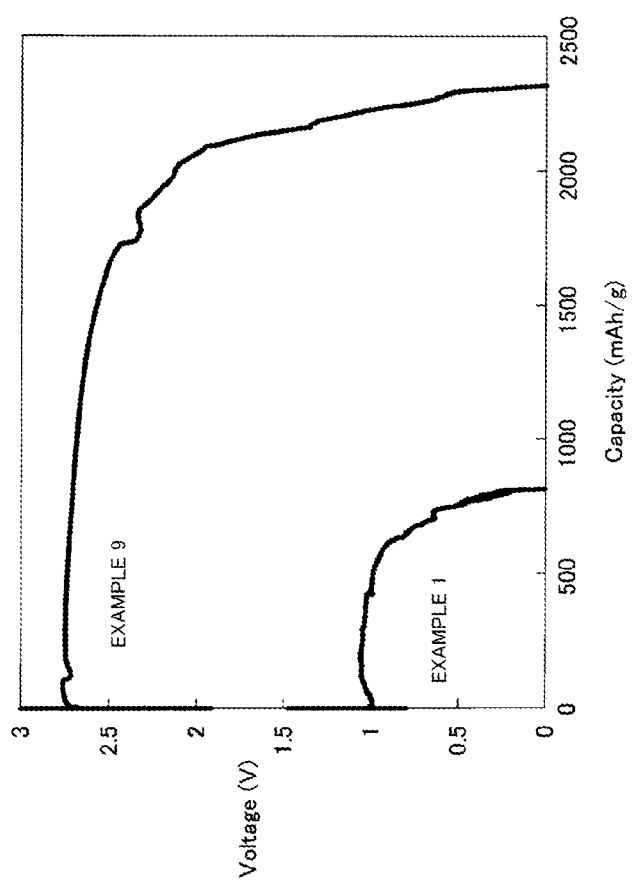
FIG. 10 is a characteristic diagram showing discharge curves of metal air batteries of Example 1 and Example 9 of the present invention.

The battery performance of the produced coin cell type air battery was measured. First, a discharging test was performed. The discharging test for the zinc air battery was performed using a commercially available charging and discharging measurement system (SD8 charging and discharging system commercially available from Hokuto Denko Corporation), and a current was applied at a current density of 0.1 $mA/cm^2$ per effective area of the air electrode, and measurement was performed until the battery voltage decreased to 0 V from an open circuit voltage. In the discharging test for this battery, measurement was performed in a constant temperature chamber at 25° C. (the atmosphere was a general living environment). The discharging capacity is represented as a value (mAh/g) per weight of the air electrode composed of a co-continuous component. FIG. 10 shows the discharge curve in Example 1.

As shown in FIG. 10, it was found that the average discharging voltage when the co-continuous component was used for the air electrode was 1.0 V, and the discharging capacity was 810 mAh/g. Here, the average discharging voltage was a battery voltage when the discharging capacity (405 mAh/g in Example 1) was ½ of the discharging capacity (810 mAh/g in the present example) of the battery.

The following Table 1 shows the discharging capacity of the zinc air battery in which a co-continuous component was composed of nanosheets made of graphene (C), iron oxide ($Fe_2O_3$), manganese oxide ($MnO_2$), zinc oxide (ZnO), molybdenum oxide ($MoO_3$), or molybdenum sulfide ($MoS_2$) to form an air electrode.

TABLE 1

| Nanosheet material | Discharging capacity (mAh/g) |
|---|---|
| Graphene (C) | 810 |
| Iron oxide ($Fe_2O_3$) | 840 |
| Manganese oxide ($MnO_2$) | 860 |
| Zinc oxide (ZnO) | 830 |
| Molybdenum oxide ($MoO_3$) | 800 |
| Molybdenum sulfide ($MoS_2$) | 800 |

In all cases, the discharging capacity was 800 mAh/g or more, which was a larger value than that of Comparative Example 1 in which the air electrode using powder carbon described below was evaluated. It was thought that, in the case of a nanosheet example made of a material other than carbon, like graphene, the battery reaction proceeded quickly due to the high specific surface area, and the discharge product [Zn(OH)$_2$] was efficiently generated, and thus the discharging capacity was improved.

Example 2

Next, Example 2 will be described. Example 2 was an example in which a co-continuous component having a 3D network structure in which a plurality of nanofibers were integrated by non-covalent bonds was used for an air electrode. The air electrode was synthesized as follows. In the following description, a production method using carbon nanofibers will be described as a representative, but the co-continuous component having a 3D network structure can be adjusted by changing the carbon nanofibers to nanofibers made of other materials.

The method of evaluating a co-continuous component, the method of producing a zinc air battery, and the discharging test method were performed in the same manner as in Example 1.

The co-continuous component was produced in the same process in Example 1, and a carbon nanofiber sol [dispersion medium: water (H$_2$O), 0.4 weight %, commercially available from Sigma-Aldrich] was used as the raw material.

The obtained co-continuous component was evaluated by performing the XRD measurement, the SEM observation, the porosity measurement, the tension test, and the BET specific surface area measurement. It was confirmed that the co-continuous component produced in the present example was a carbon (C, PDF card No. 00-058-1638) single phase according to the XRD measurement. In addition, the co-continuous component in which nanofibers were continuously connected and having an average pore size of 1 μm was confirmed according to the SEM observation and the mercury press-fitting method. In addition, when the BET specific surface area of the co-continuous component was measured by the mercury press-fitting method, it was 620 m2/g. In addition, when the porosity of the co-continuous component was measured by the mercury press-fitting method, it was 93% or more. In addition, based on the results of the tension test, it was confirmed that, even if a strain of 40% was applied by tension stress, the co-continuous component of Example 2 was restored to the shape before the stress was applied without exceeding the elastic region.

A coin cell type zinc air battery was produced in the same manner as in Example 1 using this co-continuous component composed of carbon nanofibers for an air electrode. Table 2 shows the discharging capacity of the produced zinc air battery in Example 2. In Example 2, the discharging capacity was 860 mAh/g, which was a larger value than when the graphene co-continuous component was used in Example 1. It was thought that improvement in such characteristics was caused by the fact that the reaction proceeded smoothly during discharging using a co-continuous component having a higher elasticity and a large specific surface area.

Table 2 shows the discharging capacity of the zinc air battery in which a co-continuous component was composed of nanofibers made of carbon nanofiber (C), iron oxide (Fe$_2$O$_3$), manganese oxide (MnO$_2$), zinc oxide (ZnO), molybdenum oxide (MoO$_3$), or molybdenum sulfide (MoS$_2$) to form an air electrode.

TABLE 2

| Nanofiber material | Discharging capacity (mAh/g) |
| --- | --- |
| Carbon nanofiber (C) | 860 |
| Iron oxide (Fe$_2$O$_3$) | 850 |
| Manganese oxide (MnO$_2$) | 890 |
| Zinc oxide (ZnO) | 850 |
| Molybdenum oxide (MoO$_3$) | 810 |
| Molybdenum sulfide (MoS$_2$) | 810 |

In all cases, the discharging capacity was 810 mAh/g or more, which was a value generally larger than that of the co-continuous component containing a nanosheet as in Example 1. It was thought that, also in the case of such nanofiber examples, like carbon nanofibers, since the air electrode had a high specific surface area, the battery reaction in which the discharge product [Zn(OH)$_2$] was generated proceeded efficiently and stably, and thus the discharging capacity was improved.

Example 3

Next, Example 3 will be described. In Example 3, an air electrode formed by supporting an oxide or a metal as a catalyst on a co-continuous component composed of carbon nanofibers will be described. In the following description, as a representative, a case in which MnO$_2$ as a catalyst is supported on a co-continuous component will be described. However, an arbitrary oxide as a catalyst can be supported on the co-continuous component by changing Mn to an arbitrary metal. In addition, when a neutralization process is not performed, an arbitrary metal as a catalyst can be supported on the co-continuous component.

The method of evaluating a co-continuous component, the method of producing a zinc air battery, and the discharging test method were performed in the same manner as in Examples 1 and 2.

A co-continuous component was produced in the same manner as in Example 2. Next, a commercially available manganese chloride(II) 4 hydrate (MnCl$_2$.4H$_2$O; commercially available from Kanto Chemical Co., Inc.) was dissolved in distilled water, the produced co-continuous component was impregnated, and manganese chloride was supported. Next, ammonia water (28%) was gradually added dropwise to the co-continuous component supporting manganese chloride (manganese chloride supported by a co-continuous component) until the pH reached 7.0, and neutralization was performed to precipitate manganese hydroxide. The precipitate was repeatedly washed with distilled water 5 times so that no chlorine remained.

The obtained manganese hydroxide supporting co-continuous component was heated in an argon atmosphere at 500° C. for 6 hours to produce a co-continuous component on which manganese oxide (MnO$_2$) was supported. The produced manganese oxide supporting co-continuous component was evaluated by performing the XRD measurement and TEM observation. The peak of manganese oxide (MnO$_2$, PDF file No. 00-011-079) could be observed according to the XRD measurement. It was confirmed that the catalyst supported on the co-continuous component was a manganese oxide single phase. In addition, it was observed using a TEM that manganese oxide was precipitated in the form of particles having an average particle size of 100 nm on the surface of the co-continuous component.

A coin cell type zinc air battery was produced in the same manner as in Example 1 using this co-continuous component supporting manganese oxide for an air electrode. The discharging capacity of the produced zinc air battery in Example 3 was 1,090 mAh/g. In addition, the following Table 3 shows the results obtained when other catalysts were used.

TABLE 3

| Catalyst/co-continuous component material | Discharging capacity (mAh/g) |
|---|---|
| $MnO_2$/C | 1090 |
| $Fe_2O_3$/C | 890 |
| $ZnO_2$/C | 930 |
| $MoO_3$/C | 970 |
| Fe/C | 970 |
| Mn/C | 1010 |
| Zn/C | 910 |
| Mo/C | 900 |

In Example 3, the discharging capacities were all 890 mAh/g or more, which were a larger value than when a co-continuous component on which manganese oxide was not supported as a catalyst was used in Example 3. It was confirmed that the air electrode of the zinc air battery of the present example operated stably.

Example 4

Next, Example 4 will be described. In Example 4, a case in which manganese oxide was additionally supported as a catalyst on a co-continuous component composed of a gel in which nanofibers produced by bacteria were dispersed was shown. In the following description, as a representative, a case in which a co-continuous component composed of nanofibers made of iron oxide produced by iron bacteria was produced will be described. However, when iron bacteria were changed to manganese oxide bacteria, it was possible to adjust the co-continuous component composed of nanofibers made of manganese oxide.

The method of evaluating a co-continuous component, the method of producing a zinc air battery, and the discharging test method were performed in the same manner as in Examples 1 and 2.

First, *Leptothrix ochracea* as iron bacteria was put into a JOP liquid medium in a test tube together with iron pieces (with a purity 99.9% or more, commercially available from Kojundo Chemical Laboratory Co., Ltd.), and cultured in a shaking device at 20° C. for 14 days. The JOP liquid medium was a medium which contained 1 L of sterilized groundwater, 0.076 g of disodium hydrogen phosphate dodecahydrate, 0.02 g of potassium dihydrogen phosphate dihydrate, 2.383 g of HEPES[4-(2-hydroxyethyl)-1-piperazineethanesulfonic acid: buffer solution substance], and 0.01 mmol/L of iron sulphate, and in which the pH was adjusted to 7.0 using a sodium hydroxide aqueous solution. In addition, *Leptothrix ochracea* was purchased from American Type Culture Collection (ATCC).

After culturing, the iron pieces were removed, the obtained gel was washed in pure water for 24 hours using a shaking device. In this washing, the pure water was replaced three times. The process shown in Example 3 was performed using the washed gel as a raw material, and the co-continuous component of bacteria-produced nanofibers on which manganese oxide was supported was used for an air electrode to produce a zinc air battery.

The obtained co-continuous component was evaluated by performing the XRD measurement, the SEM observation, the porosity measurement, the tension test, and the BET specific surface area measurement. It was confirmed that the co-continuous component produced in the present example was an amorphous $Fe_3O_4$ and $\gamma$-$Fe_2O_3$($Fe_3O_4$, PDF card No. 01-075-1372, $\gamma$-$Fe_2O_3$, PDF card No. 00-039-1346) according to the XRD measurement. In addition, the co-continuous component in which hollow nanofibers (nanotubes) having a diameter of 1 μm were continuously connected was confirmed according to the SEM observation. In addition, when the BET specific surface area of the co-continuous component was measured by the mercury press-fitting method, it was 800 $m^2$/g. In addition, when the porosity of the co-continuous component was measured by the mercury press-fitting method, it was 95% or more. In addition, based on the results of the tension test, it was confirmed that, even if a strain of 60% was applied by tension stress, the shape was restored to the shape before the stress was applied without exceeding the elastic region.

The discharging capacity of the zinc air battery using the co-continuous component composed of iron oxide nanofibers produced by iron bacteria in Example 4 for an air electrode was 1,240 mAh/g. In addition, the following Table 4 shows the results obtained when other co-continuous components were used.

TABLE 4

| Catalyst/co-continuous component material | Discharging capacity (mAh/g) |
|---|---|
| $MnO_2$/bacteria-produced iron oxide | 1240 |
| $MnO_2$/bacteria-produced $MnO_2$ | 1180 |

In Example 4, the value was somewhat larger than that in the case in which the co-continuous component composed of carbon nanofibers supporting manganese oxide as in Example 3 was used. This result was thought to be caused by the fact that, when the co-continuous component having a larger specific surface area was used, the discharge product was efficiently precipitated, and the reaction proceeded smoothly.

In addition, as shown in Table 4, the discharging capacity of the zinc air battery in which the co-continuous component composed of the bacteria-produced manganese oxide was used and manganese oxide was used as a catalyst to form an air electrode was 1,180 mAh/g, which was a value larger than that of Example 3. Bacteria-produced manganese oxide was produced by culturing *Leptothrix discophora* which is manganese bacterium using manganese pieces (with a purity of 99.9% or more, commercially available from Kojundo Chemical Laboratory Co., Ltd.) in the same manner as described above. *Leptothrix discophora* was purchased from ATCC. It was thought that, in the case of the bacteria-produced nanofibers, like iron bacteria-produced iron oxide, since the air electrode having excellent elasticity produced by bacteria had a large specific surface area, the battery reaction proceeded quickly, the discharge product [$Zn(OH)_2$] was efficiently generated, and as a result, the discharging capacity was improved.

Example 5

Next, Example 5 will be described. In Example 5, a case in which manganese oxide was additionally supported as a catalyst on a co-continuous component composed of a gel in which cellulose produced by bacteria was dispersed was shown. The method of evaluating a co-continuous component, the method of producing a zinc air battery, and the discharging test method were performed in the same manner as in Examples 1 and 2.

First, a zinc air battery was produced in the same process in Example 1 and Example 3 using Nata de Coco (commercially available from Fujicco Co., Ltd.) as a bacterial cellulose gel produced by *Acetobacter xylinum* which is acetobacter. Here, in Example 5, after drying was performed in a vacuum, firing was performed in a nitrogen atmosphere at 1,200° C. for 2 hours, the co-continuous component was carbonized, and thereby an air electrode was produced.

The obtained co-continuous component (carbonized co-continuous component) was evaluated by performing the XRD measurement, the SEM observation, the porosity measurement, the tension test, and the BET specific surface area measurement. It was confirmed that the co-continuous component was a carbon (C, PDF card No. 01-071-4630) single phase according to the XRD measurement. In addition, the co-continuous component in which nanofibers having a diameter of 20 nm were continuously connected was confirmed according to the SEM observation. In addition, when the BET specific surface area of the co-continuous component was measured by the mercury press-fitting method, it was 830 m2/g. In addition, when the porosity of the co-continuous component was measured by the mercury press-fitting method, it was 99% or more. In addition, based on the results of the tension test, it was confirmed that, even if a strain of 80% was applied by tension stress, the shape was restored to the shape before the stress was applied without exceeding the elastic region, and the elasticity was excellent even after carbonization.

The following Table 5 shows the discharging capacity of the zinc air battery in Example 5. Table 5 also shows the results of Examples 1, 2, 3, and 4 and Comparative Example 1 to be described below. In Example 5, the discharging capacity was 1,380 mAh/g, which was a larger value than when the co-continuous component containing iron bacteria-produced iron oxide supporting manganese oxide was used in Example 4.

TABLE 5

| Example | Average discharging voltage (V) | Discharging capacity (mAh/g) |
|---|---|---|
| Example 1 (graphene) | 1.0 | 810 |
| Example 2 (carbon nanofiber) | 1.0 | 860 |
| Example 3 (MnO$_2$/carbon nanofiber) | 1.1 | 1090 |
| Example 4 (MnO$_2$/bacteria-produced iron oxide) | 1.1 | 1240 |
| Example 5 (MnO$_2$/carbonized bacterial cellulose) | 1.2 | 1380 |
| Comparative Example 1 (Ketjen black) | 0.9 | 680 |

It was thought that improvement in the above characteristics was caused by the fact that, in addition to making the air electrode have a co-continuous component structure having a higher elasticity and large specific surface area, carbon as a material had excellent conductivity, and thus the reaction in which the discharge product [Zn(OH)$_2$] was generated during discharging proceeded smoothly.

As described above, according to the present embodiment, in high porosity and BET specific surface area measurement, a co-continuous component having elasticity was obtained, and according to the zinc air battery using the co-continuous component for an air electrode, the discharge product [Zn(OH)$_2$] precipitate was efficiently realized during discharging. It was thought that improvement in the above characteristics was due to the improvement in the present embodiment in which, regarding the electrode, carbonized bacterial cellulose was used for the electrode, and the catalyst was additionally supported.

Example 6

Next, Example 6 will be described. In Example 6, a case in which the co-continuous component of Example 5 was used, and the metal type used for the negative electrode was changed will be described. The method of producing a battery and the discharging test method were performed in the same manner as in Examples 1 and 2.

The following Table 6 shows the discharging capacity of the metal air battery in which a magnesium alloy plate, an aluminum plate, a zinc plate, or an iron plate was used for the negative electrode.

TABLE 6

| Negative electrode metal | Average discharging voltage (V) | Discharging capacity (mAh/g) |
|---|---|---|
| Zinc | 1.1 | 1380 |
| Magnesium alloy | 1.3 | 1810 |
| Aluminum | 1.2 | 1510 |
| Iron | 1.1 | 1340 |

In Example 6, when the magnesium alloy plate was used for the negative electrode, the discharging capacity was 1,810 mAh/g and the voltage was about 1.3 V, which were larger values than when other metals were used.

It was thought that a difference in the above characteristics was caused by the fact that ease of dissolution in the electrolytic solution was influenced by the ionization tendency of the metal, and it was thought that the difference was caused by the fact that, when the magnesium alloy plate was used for the negative electrode, electrons generated by dissolution in the negative electrode metal were used in the battery reaction most efficiently.

As described above, according to the present embodiment, when a magnesium alloy plate (Al 1% to 10%, Zn 1% to 10%) was used for the negative electrode of the metal air battery using this co-continuous component for an air electrode, a most efficient electron flow was realized during discharging. It was thought that improvement in the above characteristic was due to various improvements according to the present embodiment.

Example 7

Next, Example 7 will be described. In Example 7, a case in which the same co-continuous component as in Example 6 was used, a magnesium alloy plate was used for the negative electrode, and the electrolyte was changed will be described. The method of producing a battery and the discharging test method were performed in the same manner as in Examples 1 and 2. The electrolytic solution was adjusted in the same manner as in Example 1, a solution dissolved in pure water at a concentration of 1 mol/L was used, but for magnesium citrate and calcium citrate, since the solubility in water was low, a solution dissolved in 0.1 mol/L citric acid was used.

The following Table 7 shows the discharging capacity of the metal air battery in which hydrochloric acid, sodium chloride, magnesium chloride, potassium chloride, calcium chloride, acetic acid, sodium acetate, magnesium acetate, potassium acetate, calcium acetate, carbonate, sodium carbonate, magnesium carbonate, potassium carbonate, calcium carbonate, citric acid, sodium citrate, magnesium citrate, potassium citrate, calcium citrate, phosphoric acid, HEPES, sodium pyrophosphate, or sodium metaphosphate was used as an electrolyte, and pH values before and after the measurement.

Figure 11:
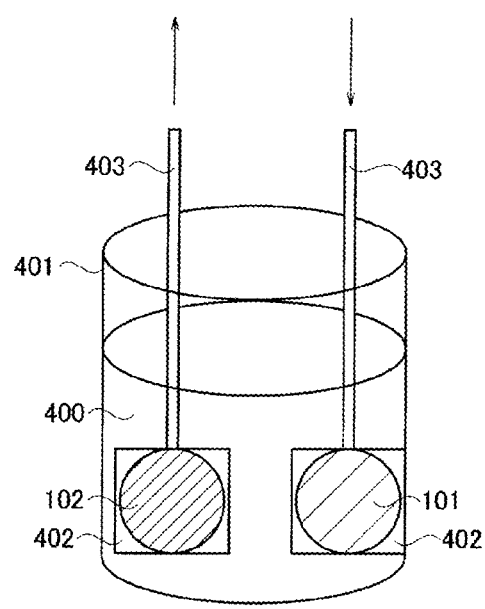
FIG. 11 is a diagram showing a configuration example of a beaker cell used for pH measurement in Example 7 of the present invention.

The pH was measured using a pH measurement instrument (D-52 commercially available from HORIBA), as shown in FIG. 11, the battery reaction proceeded in a beaker cell 401 filled with an electrolytic solution 400, and the pH was measured before and after the reaction. The negative electrode 102 and the air electrode 101 were adjusted by cutting into a circle having a diameter of 14 mm using a punching blade, a laser cutter or the like. First, the peripheral part of a copper mesh foil 402 (commercially available from MIT Japan) was fixed by spot welding, and the air electrode 101 was installed inside the copper mesh foil 402. In addition, similarly, the negative electrode 102 composed of a magnesium alloy plate was fixed in the copper mesh foil 402 (commercially available from MIT Japan) by spot welding. Copper ribbons 403 were fixed thereto by spot welding in advance, a charging and discharging measurement system (not shown, SD8 charging and discharging system commercially available from Hokuto Denko Corporation) was connected to the copper ribbon 403, a current was applied at a current density of 0.1 mA/cm2 per effective area of the air electrode 101, and the current flowed until the battery voltage decreased to 0 V from an open circuit voltage.

TABLE 7

| Electrolyte | Discharging capacity (mAh/g) | pH Before | pH After |
|---|---|---|---|
| Hydrochloric acid | 980 | 1.9 | 2.8 |
| Sodium chloride | 1810 | 7.4 | 11.2 |
| Magnesium chloride | 1830 | 7.3 | 10.9 |
| Potassium chloride | 1800 | 7.1 | 10.8 |
| Calcium chloride | 1790 | 7.2 | 11.0 |
| Acetic acid | 2010 | 6.5 | 10.8 |
| Sodium acetate | 2100 | 6.2 | 8.8 |
| Magnesium acetate | 2280 | 6.1 | 8.3 |
| Potassium acetate | 2090 | 6.2 | 8.9 |
| Calcium acetate | 2030 | 5.9 | 8.8 |
| Carbonate | 1880 | 6.7 | 11.3 |
| Sodium carbonate | 1930 | 6.9 | 11.4 |
| Magnesium carbonate | 1970 | 6.8 | 11.2 |
| Potassium carbonate | 1950 | 6.8 | 11.1 |
| Calcium carbonate | 1900 | 6.7 | 11.0 |
| Citric acid | 950 | 2.7 | 3.0 |
| Sodium citrate | 1980 | 6.3 | 9.5 |
| Magnesium citrate | 2150 | 5.6 | 9.4 |
| Potassium citrate | 2010 | 6.4 | 9.6 |
| Calcium citrate | 1950 | 5.7 | 9.6 |
| Phosphoric acid | 910 | 6.2 | 8.8 |
| HEPES | 1880 | 6.3 | 10.5 |
| Sodium pyrophosphate | 1940 | 6.1 | 10.6 |
| Sodium metaphosphate | 1920 | 6.2 | 10.4 |

In Example 7, when magnesium acetate was used as an electrolyte, the discharging capacity was 2,280 mAh/g, which was a larger value than when sodium chloride was used as an electrolyte as in Examples 1 to 6.

Based on Table 8, first, when a strong acid salt such as hydrochloric acid or citric acid was used in the electrolytic solution, the negative electrode dissolved quickly and the discharging capacity was very small. Regarding a salt effective for improving characteristics, it was thought that an electrolytic solution containing no chloride ions was able to minimize corrosion of the negative electrode with chloride ions, and accordingly, it had the greatest influence on the discharging capacity. It was thought that, when a weakly acidic salt such as acetate or citrate was used, it was possible to minimize the increase in the pH of the electrolytic solution, and passivation was less likely to be formed on the surface of the negative electrode, and thus the discharging capacity was improved. Among acetate, carbonate, and citrate categories, the magnesium salt had the largest volume, and it was thought that this was because self-corrosion of magnesium in the negative electrode was minimized when the magnesium salt was dissolved as an electrolyte.

As described above, according to the present embodiment, when magnesium acetate was used, improvement in the discharging capacity was realized. In addition, since magnesium acetate was a component used as a fertilizer, this was a preferable electrolytic solution in consideration of the environmental load. It was thought that improvement in the above characteristic was due to various improvements according to the present embodiment.

Example 8

Next, Example 8 will be described. In Example 8, based on the results of Examples 1 to 7, a case in which manganese oxide was additionally supported as a catalyst on a co-continuous component composed of a gel in which cellulose produced by bacteria was dispersed, a magnesium alloy (with a thickness of 200 μm) was used for a negative electrode, a magnesium acetate solution was used as an electrolytic solution, and thereby a bipolar type coin battery was produced will be described. The coin battery of the present example was produced as described in FIG. 8A and FIG. 8B. The method of synthesizing a co-continuous component on which manganese oxide was supported as a catalyst, the method of evaluating a co-continuous component, and the discharging test method were performed in the same manner as in Example 5. In the following description, as a representative, a case in which carbon cloth (commercially available from Toyo Corporation) and a copper foil were used for a current collector is shown, but an arbitrary current collector can be produced by performing changing to an arbitrary form or arbitrary metal.

First, when carbon cloth was used for the current collector, the carbon cloth and the plant-based film sheet Ecoloju (commercially available from Mitsubishi Plastics, Inc.) were superimposed and heat-pressed. The heat-pressing was continued at 0.2 MPa for about 10 seconds, and the film sheet was adhered to the carbon cloth. The negative electrode was cut into a circle having a diameter of 12 mm using a punching blade, a laser cutter or the like, the fixing part for the current collector was fixed to the negative electrode by superimposing a ring-shaped film sheet having an inner diameter of 11 mm and an outer diameter of 14 mm on the negative electrode and performing heat-pressing.

Next, when a copper foil was used for the current collector, the copper foil and the negative electrode were cut into a circle having a diameter of 14 mm using a punching blade, a laser cutter or the like, a biodegradable fumigation coating sheet (commercially available from Shinano Chemical Industry, Co., Ltd.) was cut to 5 mm×100 mm, and sealing was performed to fix the negative electrode.

Table 8 shows the discharging capacity and voltage of the magnesium air battery in Example 8.

TABLE 8

| Current collector | Average discharging voltage (V) | Discharging capacity (mAh/g) |
|---|---|---|
| Example 8 (carbon cloth) | 2.7 | 2310 |
| Example 8 (carbon felt) | 2.5 | 2300 |
| Example 8 (copper foil) | 2.6 | 2310 |
| Example 8 (aluminum foil) | 2.5 | 2290 |
| Example 8 (iron foil) | 2.5 | 2300 |
| Comparative Example 2 (carbon cloth) | 2.3 | 1140 |

* without fixing part

In Example 8, it was confirmed that, regardless of which current collector was used, the capacity was about 2,300 mAh/g, which was larger than the capacity of the following [Comparative Example 2] in which a coin battery was formed without providing the fixing part of the negative electrode to the current collector. When the battery after discharging was disassembled, in Comparative Example 2, a discharge product was confirmed between the negative electrode and the current collector after discharging, but it was hardly confirmed in Example 8. Accordingly, it was speculated that the product between the negative electrode and the current collector inhibited the battery reaction.

Example 9

Next, Example 9 will be described. In Example 9, based on the results of Examples 1 to 8, a case in which manganese oxide was additionally supported as a catalyst on a co-continuous component composed of a gel in which cellulose produced by bacteria was dispersed, a magnesium alloy was used for a negative electrode, a magnesium acetate solution was used as an electrolytic solution, and carbon cloth was used for a current collector, and thereby a magnesium air battery was produced will be described. As described with reference to FIG. 9B, the magnesium air battery was naturally decomposed with the housing. The method of synthesizing a co-continuous component on which manganese oxide was supported as a catalyst, the method of evaluating a co-continuous component, and the charging and discharging test method were performed in the same manner as in Example 5.

A method of producing a magnesium air battery in Example 9 will be described below. The negative electrode was produced by cutting a commercially available magnesium alloy plate (with a thickness of 200 μm, commercially available from The Nilaco Corporation) into a square of 20 mm×20 mm using scissors.

The peripheral part of the negative electrode formed of a magnesium alloy plate was fixed to a copper mesh foil (commercially available from MIT Japan) as a negative electrode current collector by spot welding, additionally, the copper mesh foil was cut into 25 mm×25 mm in a plan view, and this end was spot-welded to the short side of the copper foil (commercially available from The Nilaco Corporation) as a terminal cut into 3×20 mm.

In addition, an air electrode was compressed to a copper mesh foil (commercially available from MIT Japan) cut to 25 mm×25 mm as a current collector for the air electrode, and the end of this copper mesh foil was spot-welded to the short side of the copper foil (commercially available from The Nilaco Corporation) as a terminal cut into 3×20 mm.

Regarding the material of the housing, a plant-based film sheet Ecoloju (commercially available from Mitsubishi Plastics, Inc.) was used. Two cut sheets obtained by cutting this sheet into 30 m×30 mm in a plan view were produced, one sheet was used as a first housing and the other sheet was used as a second housing. In addition, in the second housing used on the side of the positive electrode, an opening of 15 mm×15 mm was formed at the center.

On the first housing on the side of the negative electrode, the negative electrode current collector to which the negative electrode was fixed and the separator were disposed, and the air electrode current collector to which the air electrode was compressed, the current collector, the second negative electrode, its fixing part, and the separator were disposed in this order, and additionally, they were covered with the second housing, and the inner peripheral parts (with a width of about 5 mm) of the first housing and the second housing were adhered with a biodegradable resin (commercially available from Miyoshi Oil & Fat Co., Ltd.) and sealed. In this manner, a magnesium air battery was produced.

Table 9 shows the discharging capacity of the magnesium air battery in Example 9. Table 9 also shows the results of Example 8. As shown in Table 9, in Example 9, the discharging capacity was 2,000 mAh/g, and the average discharging voltage was 2.5 V, which were lower than those when the coin type cell of Example 8 was used, but it was confirmed that the battery operated stably without any problem.

TABLE 9

| Example | Negative electrode metal | Electrolyte | Air electrode | Average discharging voltage (V) | Discharging capacity (mAh/g) |
|---|---|---|---|---|---|
| Example 8 | Magnesium alloy | Magnesium acetate | Carbonized bacterial cellulose | 2.7 | 2310 |
| Example 9 | | | | 2.5 | 2000 |
| Example 10 | | | | 2.5 | 1810 |

After discharging, when the magnesium air battery of Example 9 was installed in soil, the decomposition of the housing was visible by about half a month, and the battery had completely disappeared after about one month. This indicated that the battery was metabolized and decomposed by microorganisms in soil.

Example 10

Next, Example 10 will be described. In Example 10, the discharging test was performed on a magnesium air battery produced in the same procedures as in Example 9 under an environment simulating soil. Specifically, 540 g of decomposed granite soil passed through a 2 mm sieve was filled into a 1/10,000a Neubauer pot, covered with 70 g of sand soil, and embedded so that only the terminal of the magnesium battery was exposed above the sand soil. This terminal was connected to a measurement device, and the discharging capacity was measured in the same manner as in Example 1.

The above Table 9 shows the discharging capacity of the magnesium air battery in Example 10. As shown in Table 9, in Example 10, the discharging capacity was 1,810 mAh/g, which was lower than that of Example 9, but it indicated that the battery operated without problems even in soil environment. In addition, when the magnesium air battery in Example 10 after discharging was left in soil, it had completely disappeared about one month after the discharging test started.

Comparative Example 1

Next, Comparative Example 1 will be described. In Comparative Example 1, a zinc air battery was produced using carbon (Ketjen black EC600JD) known for an electrode for an air electrode and manganese oxide and evaluated. In Comparative Example 1, a coin cell type zinc air battery was produced in the same manner as in Example 1. Regarding the electrolyte, sodium chloride (1 mol/L) as in Example 5 was used.

Manganese oxide powder (commercially available from Kanto Chemical Co., Inc.), Ketjen black powder (commercially available from Lion Corporation) and polytetrafluoroethylene (PTFE) powder (commercially available from Daikin Industries, Ltd.) at a weight ratio of 50:30:20 were sufficiently crushed and mixed using a mortar machine, and roll-molded to produce a sheet-like electrode (thickness: 0.5 mm). This sheet-like electrode was cut into a circle having a diameter of 14 mm to obtain an air electrode. The conditions for the battery discharging test were the same as in Example 1.

The discharging capacity of the zinc air battery according to Comparative Example 1 is shown in Table 5 together with the results of Examples 1 to 5. As shown in Table 5, the discharging capacity of Comparative Example 1 was 680 mAh/g, which was a value smaller than that of Example 1. In addition, when the air electrode of Comparative Example 1 after measurement was observed, a state in which a part of the air electrode collapsed and was dispersed in the electrolytic solution, and the electrode structure of the air electrode was destroyed was observed.

Based on the above results, it was confirmed that the metal air battery of the present embodiment had a superior capacity and voltage to the metal air battery using an air electrode made of a known material.

Comparative Example 2

Next, Comparative Example 2 will be described. As in Example 8, in Comparative Example 2, a case in which manganese oxide was additionally supported as a catalyst on a co-continuous component composed of a gel in which cellulose produced by bacteria was dispersed, a magnesium alloy (thickness of 200 μm) was used for a negative electrode, a magnesium acetate solution was used as an electrolytic solution, and carbon cloth was used for a current collector, and thereby a magnesium air battery was produced will be described. The battery of the present example was a coin cell type magnesium air battery, and had a configuration in which there was no fixing part 105 in FIG. 8A, and the negative electrode 102 in contact with the current collector 104 was not fixed to the current collector 104.

The discharging capacity and voltage of the magnesium air battery of Comparative Example 2 are shown in Table 8 together with the results of Example 8. As shown in Table 8, the discharging capacity of Comparative Example 2 was 1,140 mAh/g, which was a value smaller than that of Example 8.

Figure 12:
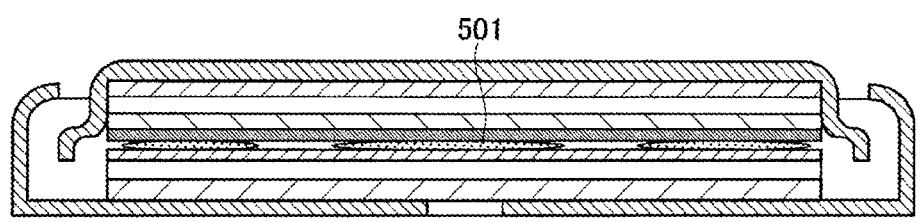
FIG. 12 is a cross-sectional view of a coin battery in Comparative Example 2 of the present invention and is a diagram showing a part in which a discharge product is precipitated.

In addition, as shown in FIG. 12, it was thought that, when the negative electrode of Comparative Example 2 after measurement was observed, a discharge product 501 was precipitated between the negative electrode and the current collector, the contact resistance increased accordingly, which caused a decrease in the discharging capacity.

As described above, according to the present embodiment, since the air electrode 101 of the metal air battery was composed of a co-continuous component having a 3D network structure in which a plurality of nanostructures were integrated by non-covalent bonds, the metal air battery can be handled more easily.

In addition, since the metal air battery of the present embodiment did not contain element used for soil fertilizers or metal elements other than metals contained in rainwater and seawater, and was naturally decomposed, the environmental load was very low. Such batteries can be effectively used as various drive sources such as disposable batteries in daily environments and sensors used in soil.

In addition, according to the present embodiment, the discharging capacity of the metal air battery can be increased by selecting an appropriate negative electrode metal type and electrolytic solution type. That is, when the air electrode 101 of the metal air battery is composed of a co-continuous component having a 3D network structure in which a plurality of nanostructures are integrated by non-covalent bonds and the electrolyte 103 interposed between the air electrode and the negative electrode is composed of a salt containing no chloride ions, it is possible to use electrons efficiently, and minimize formation of passivation and self-corrosion of the negative electrode, and it is possible to increase the discharging capacity of the metal air battery. In addition, since the negative electrode 102 is composed of any metal of magnesium, aluminum, calcium, iron, and zinc or composed of an alloy thereof, it is possible to further increase the discharging capacity of the metal air battery.

In addition, in the present embodiment, when the current collector 104 as a bipolar layer is provided and the batteries are laminated, if the current collector and the negative electrode are fixed, it is possible to prevent deterioration in the battery performance. Specifically, in the present embodiment, when the current collector 104 is interposed between the air electrode 101 of the first battery and the negative electrode 102 of the second battery, and the current collector 104 and the negative electrode 102 are brought into close contact with each other with a biodegradable material to form a bipolar type battery, an excellent effect of improving the performance of the metal air battery with a small environmental load can be obtained. That is, it is possible to improve the performance of the bipolar type metal air battery without using a substance with an environmental load such as minor metals.

In addition, since the current collector 104 of the present embodiment is made of a biodegradable material and has water impermeability and adhesion to the negative electrode, it is possible to form a bipolar type metal air battery having a low environmental load, and the battery performance is improved.

Here, it is apparent that the present invention is not limited to the embodiments described above, and many modifications and combinations can be implemented by those skilled in the art within the sprit and scope of the present invention.

REFERENCE SIGNS LIST 101, 101a, 101b Air electrode
102, 102b, 102b Negative electrode
103 Electrolyte
104 Current collector
105 Fixing part
201 Air electrode case
202 Negative electrode case
203 Gasket
300 Housing
301 Negative electrode current collector
302 Positive electrode current collector
311 First housing
312 Second housing
321 Terminal
322 Terminal
400 Electrolytic solution
401 Beaker cell
402 Copper mesh foil
403 Copper ribbon

The invention claimed is:

1. A bipolar type metal air battery, comprising:
a plurality of cells including an air electrode composed of a co-continuous component having a 3D network structure in which a plurality of nanostructures are integrated by non-covalent bonds, a negative electrode, and an electrolyte disposed between the air electrode and the negative electrode; and
a current collector disposed between the plurality of cells, wherein the plurality of cells are electrically connected in series, and wherein the current collector is in contact with the negative electrode using a biodegradable material.

2. The bipolar type metal air battery according to claim 1, wherein the current collector is made of cloth, felt, a foil or a plate composed of at least one of carbon, copper, aluminum, zinc, iron, or calcium.

3. The bipolar type metal air battery according to claim 1, wherein the nanostructure of the air electrode is a nanosheet composed of at least one of carbon, iron oxide, manganese oxide, zinc oxide, molybdenum oxide, or molybdenum sulfide or a nanofiber composed of at least one of carbon, iron oxide, manganese oxide, zinc oxide, molybdenum oxide, molybdenum sulfide, or cellulose.

4. The bipolar type metal air battery according to claim 1, wherein the air electrode supports a catalyst composed of at least one metal of iron, manganese, zinc, copper, or molybdenum or an oxide of at least one metal of calcium, iron, manganese, zinc, copper, or molybdenum.

5. An air electrode production method which is a method of producing an air electrode of the bipolar type metal air battery according to claim 1, the method comprising:
a freezing process in which a sol or gel in which the nanostructure is dispersed is frozen to obtain a frozen component; and
a drying process in which the frozen component is dried in a vacuum to obtain the co-continuous component.

6. An air electrode production method which is a method of producing an air electrode of the bipolar type metal air battery according to claim 1, the method comprising:
a gel production process in which a gel in which iron oxide or manganese oxide nanofibers are dispersed is produced by bacteria;
a freezing process in which the gel is frozen; and
a drying process in which the frozen gel component is dried.

7. An air electrode production method which is a method of producing an air electrode of the bipolar type metal air battery according to claim 1, the method comprising:
a gel production process in which a gel in which cellulose nanofibers are dispersed is produced by bacteria; a freezing process in which the gel is frozen;
a drying process in which the frozen gel component is dried; and
a carbonization process in which the co-continuous component obtained by drying is heated and carbonized in a gas atmosphere in which cellulose does not burn.

8. A current collector production method which is a method of producing a current collector of the bipolar type metal air battery according to claim 1, the method comprising:
a process in which a water-permeable material is made water impermeable using the biodegradable material; and
a process in which the water impermeable material and the negative electrode are brought into contact with each other using the biodegradable material.

9. The bipolar type metal air battery according to claim 2, wherein the nanostructure of the air electrode is a nanosheet composed of at least one of carbon, iron oxide, manganese oxide, zinc oxide, molybdenum oxide, or molybdenum sulfide or a nanofiber composed of at least one of carbon, iron oxide, manganese oxide, zinc oxide, molybdenum oxide, molybdenum sulfide, or cellulose.

10. The bipolar type metal air battery according to claim 2, wherein the air electrode supports a catalyst composed of at least one metal of iron, manganese, zinc, copper, or molybdenum or an oxide of at least one metal of calcium, iron, manganese, zinc, copper, or molybdenum.

11. The bipolar type metal air battery according to claim 3, wherein the air electrode supports a catalyst composed of at least one metal of iron, manganese, zinc, copper, or molybdenum or an oxide of at least one metal of calcium, iron, manganese, zinc, copper, or molybdenum.

12. An air electrode production method which is a method of producing an air electrode of the bipolar type metal air battery according to claim 2, the method comprising:
a freezing process in which a sol or gel in which the nanostructure is dispersed is frozen to obtain a frozen component; and
a drying process in which the frozen component is dried in a vacuum to obtain the co-continuous component.

13. An air electrode production method which is a method of producing an air electrode of the bipolar type metal air battery according to claim 3, the method comprising:
a freezing process in which a sol or gel in which the nanostructure is dispersed is frozen to obtain a frozen component; and
a drying process in which the frozen component is dried in a vacuum to obtain the co-continuous component.

14. An air electrode production method which is a method of producing an air electrode of the bipolar type metal air battery according to claim 4, the method comprising:
a freezing process in which a sol or gel in which the nanostructure is dispersed is frozen to obtain a frozen component; and
a drying process in which the frozen component is dried in a vacuum to obtain the co-continuous component.

15. An air electrode production method which is a method of producing an air electrode of the bipolar type metal air battery according to claim 2, the method comprising:

a gel production process in which a gel in which iron oxide or manganese oxide nanofibers are dispersed is produced by bacteria;
a freezing process in which the gel is frozen; and
a drying process in which the frozen gel component is dried.

16. An air electrode production method which is a method of producing an air electrode of the bipolar type metal air battery according to claim 3, the method comprising:
a gel production process in which a gel in which iron oxide or manganese oxide nanofibers are dispersed is produced by bacteria;
a freezing process in which the gel is frozen; and
a drying process in which the frozen gel component is dried.

17. An air electrode production method which is a method of producing an air electrode of the bipolar type metal air battery according to claim 4, the method comprising:
a gel production process in which a gel in which iron oxide or manganese oxide nanofibers are dispersed is produced by bacteria;
a freezing process in which the gel is frozen; and
a drying process in which the frozen gel component is dried.

18. An air electrode production method which is a method of producing an air electrode of the bipolar type metal air battery according to claim 2, the method comprising:
a gel production process in which a gel in which cellulose nanofibers are dispersed is produced by bacteria;
a freezing process in which the gel is frozen; a drying process in which the frozen gel component is dried; and
a carbonization process in which the co-continuous component obtained by drying is heated and carbonized in a gas atmosphere in which cellulose does not burn.

19. An air electrode production method which is a method of producing an air electrode of the bipolar type metal air battery according to claim 3, the method comprising:
a gel production process in which a gel in which cellulose nanofibers are dispersed is produced by bacteria;
a freezing process in which the gel is frozen; a drying process in which the frozen gel component is dried; and
a carbonization process in which the co-continuous component obtained by drying is heated and carbonized in a gas atmosphere in which cellulose does not burn.

20. An air electrode production method which is a method of producing an air electrode of the bipolar type metal air battery according to claim 4, the method comprising:
a gel production process in which a gel in which cellulose nanofibers are dispersed is produced by bacteria;
a freezing process in which the gel is frozen; a drying process in which the frozen gel component is dried; and
a carbonization process in which the co-continuous component obtained by drying is heated and carbonized in a gas atmosphere in which cellulose does not burn.

* * * * *